United States Patent
Lu

(10) Patent No.: US 11,409,493 B2
(45) Date of Patent: Aug. 9, 2022

(54) PHOTOGRAPHING METHOD AND TERMINAL DEVICE

(71) Applicant: Huawei Technologies Co., Ltd., Shenzhen (CN)

(72) Inventor: Songchao Lu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 17/056,912

(22) PCT Filed: May 23, 2018

(86) PCT No.: PCT/CN2018/088063
§ 371 (c)(1),
(2) Date: Nov. 19, 2020

(87) PCT Pub. No.: WO2019/222946
PCT Pub. Date: Nov. 28, 2019

(65) Prior Publication Data
US 2021/0216267 A1    Jul. 15, 2021

(51) Int. Cl.
*G06F 3/14* (2006.01)
*H04W 76/10* (2018.01)
(Continued)

(52) U.S. Cl.
CPC ............ *G06F 3/1454* (2013.01); *G06V 20/10* (2022.01); *H04N 5/232935* (2018.08); *H04W 76/10* (2018.02)

(58) Field of Classification Search
None
See application file for complete search history.

(56) References Cited

U.S. PATENT DOCUMENTS 9,912,861 B1    3/2018    Solh et al.
2008/0068371 A1    3/2008    Sun et al.
(Continued)

FOREIGN PATENT DOCUMENTS

CN    101043469 A    9/2007
CN    101729657 A    6/2010
(Continued)

OTHER PUBLICATIONS

MQTT Version 3.1.1, :"OASIS Standard," Oct. 29, 2014, http://docs.oasis-open.org/mqtt/mqtt/v3.1.1/os/mqtt-v3.1.1-os.html, 81 pages.

*Primary Examiner* — Toan H Vu
(74) *Attorney, Agent, or Firm* — Conley Rose, P.C.

(57) ABSTRACT

A photographing method includes enabling, by a first terminal device, an image shooting function, and obtaining and displaying a preview image, outputting, by the first terminal device, first prompt information based on the preview image if the preview image includes an image of an image output device, where the first prompt information indicates that the first terminal device can connect to a second terminal device which is a device determined by the first terminal device based on feature information of the image output device, connecting, by the first terminal device, to the second terminal device in response to an operation of triggering the first prompt information, receiving, by the first terminal device, first image sent by the second terminal device, where the first image includes content currently played by an image output device of the second terminal device.

20 Claims, 20 Drawing Sheets

(51) Int. Cl.
*H04N 5/232* (2006.01)
*G06V 20/10* (2022.01)

(56) References Cited

U.S. PATENT DOCUMENTS

| | | |
|---|---|---|
| 2010/0093399 A1 | 4/2010 | Kim et al. |
| 2010/0238194 A1 | 9/2010 | Roach, Jr. |
| 2011/0117878 A1 | 5/2011 | Barash et al. |
| 2012/0249554 A1 | 10/2012 | Chen et al. |
| 2014/0354852 A1 | 12/2014 | Won et al. |
| 2016/0117076 A1* | 4/2016 | Kim .................. H04M 1/724 |
| | | 715/735 |
| 2016/0198100 A1* | 7/2016 | Cho ................... H04L 51/10 |
| | | 348/222.1 |
| 2017/0019839 A1* | 1/2017 | Li ......................... H04W 4/06 |
| 2017/0134553 A1* | 5/2017 | Jeon ..................... H04W 4/08 |
| 2017/0208241 A1* | 7/2017 | Choi ................... G06F 1/1686 |
| 2017/0214856 A1* | 7/2017 | Liao ....................... G06T 7/70 |
| 2018/0063431 A1 | 3/2018 | Cho et al. |
| 2018/0184038 A1* | 6/2018 | Li ....................... H04N 5/44504 |
| 2018/0270420 A1* | 9/2018 | Lee ..................... H04N 5/2258 |
| 2019/0149584 A1* | 5/2019 | DiBello ............ H04L 12/1827 |
| | | 709/204 |
| 2020/0019213 A1* | 1/2020 | Lee ........................ G02B 13/06 |
| 2020/0244874 A1* | 7/2020 | Baldwin .......... H04N 5/232935 |

FOREIGN PATENT DOCUMENTS

| | | |
|---|---|---|
| CN | 103179366 A | 6/2013 |
| CN | 103841460 A | 6/2014 |
| CN | 105100479 A | 11/2015 |
| CN | 105653496 A | 6/2016 |
| CN | 105812667 A | 7/2016 |
| CN | 106126580 A | 11/2016 |
| CN | 106371608 A | 2/2017 |
| CN | 106445298 A | 2/2017 |
| CN | 105681920 B | 3/2017 |
| CN | 106657771 A | 5/2017 |
| CN | 107979727 A | 5/2018 |
| EP | 2466921 A2 | 6/2012 |
| EP | 3200553 A1 | 8/2017 |
| EP | 3288254 A1 | 2/2018 |
| KR | 101561049 B1 | 10/2015 |
| KR | 20170059310 A | 5/2017 |
| WO | 2013182136 A2 | 12/2013 |

* cited by examiner

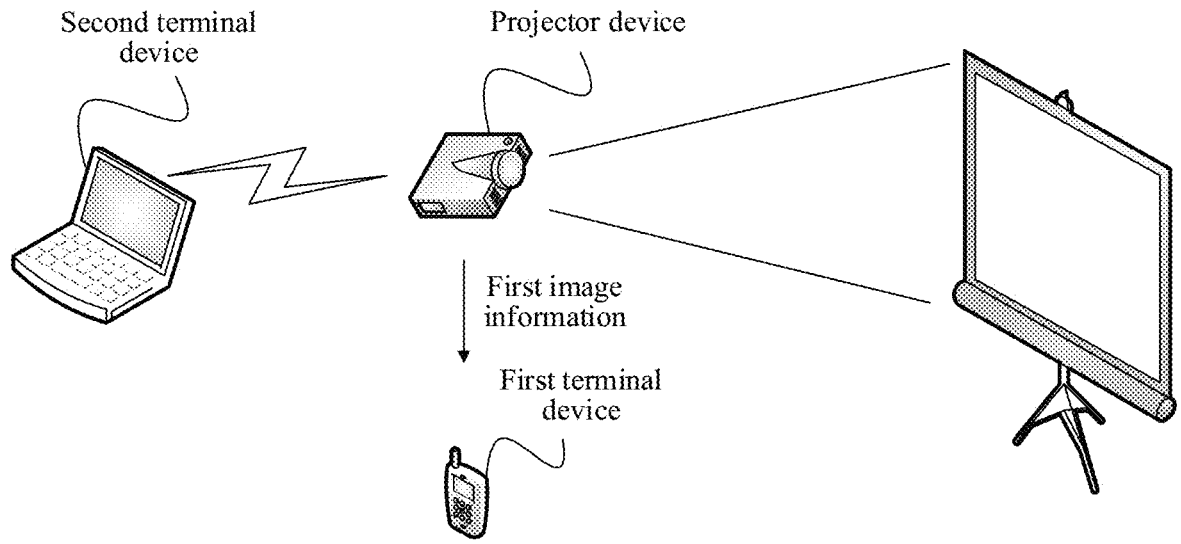

FIG. 2B

| A first terminal device establishes a connection to a second terminal device, where the first terminal device has an image shooting function, the second terminal device may be a terminal device having a display, or may be a projector | S301 |

| The first terminal device enables the image shooting function, and displays a preview screen, where the preview screen includes first image information sent by the second terminal device, and the first image information is content currently played by an output device of the second terminal device | S302 |

FIG. 3

PHOTOGRAPHING METHOD AND TERMINAL DEVICE

CROSS-REFERENCE TO RELATED APPLICATIONS

This application is a U.S. National Stage of International Patent Application No. PCT/CN2018/088063, filed on May 23, 2018, which is hereby incorporated by reference in its entirety.

TECHNICAL FIELD

This application relates to the field of terminal technologies, and in particular, to a photographing method and a terminal device.

BACKGROUND

With development of communications technologies, various functions of a terminal device are continuously improved. A shooting function of the terminal device has become one of functions that are frequently used by a user. The user records every detail in life through photographing or video recording. For example, during a meeting, the user may photograph and store display content of a slideshow by using a mobile phone in the meeting for subsequent viewing. However, during a large meeting, a user may be relatively far away from display content of a slideshow. When the user photographs the display content of the slideshow by using a mobile phone, the display content of the slideshow cannot be completely viewed from an image obtained through photographing due to a shooting angle, a block to the display content from a front-row person, or the like. In this case, a shooting function of the mobile phone does not achieve an effect expected by the user. Therefore, currently, the terminal device has a limited shooting function.

SUMMARY

This application provides a photographing method and a terminal device, to clearly photograph display content on a screen, improve a photographing effect of the terminal device, and improve user experience.

According to a first aspect, an embodiment of the present invention provides a photographing method, and the method is applicable to a terminal device having an image shooting function. The method includes: enabling, by the first terminal device, the image shooting function based on a first operation performed by a user, and obtaining and displaying a preview image; outputting, by the first terminal device, first prompt information based on the preview image if the preview image includes an image of an image output device, where the first prompt information is used to indicate, to the user, that the first terminal device can connect to a second terminal device, and the second terminal device is a device determined by the first terminal device based on feature information of the image output device; connecting, by the first terminal device, to the second terminal device in response to an operation of triggering the first prompt information; receiving, by the first terminal device, first image information sent by the second terminal device, where the first image information includes content currently played by an image output device of the second terminal device; and displaying, by the first terminal device, the first image information.

In this embodiment of this application, that the image output device is a display is used as an example. When the user photographs the display by using the first terminal device, the first terminal device determines the second terminal device based on the feature information of the display, and indicates, to the user, that the first terminal device can connect to the second terminal device. The user establishes a connection between the first terminal device and the second terminal by triggering prompt information, and receives and displays the first image information sent by the second terminal device. In this process, the first terminal device may help the user determine a device to which the first terminal device is to connect, to facilitate use by the user, and improve user experience. In addition, the user can clearly obtain display content on the display without a need to consider a shooting angle or blocking of a front-row person in some display content on the display, to improve photographing efficiency of a terminal device.

In a possible design, the first terminal recognizes an image that is of the image output device and that is included in the preview image, to obtain the feature information, where the feature information includes a device identifier and/or a device type.

In this embodiment of this application, a camera is used as an example. The first terminal device starts the camera to display the preview image. If the preview image includes an image of a display (for example, the image output device is a display), the first terminal device may recognize the image of the display, to obtain feature information such as a device identifier or a device type of the display, so that the first terminal device determines the second terminal device based on the feature information. In this manner, the user does not need to determine a device to which the first terminal device is to connect, and the first terminal device may help the user determine a device to which the first terminal device can connect, to facilitate use by the user, and improve user experience.

In a possible design, in a case in which the first terminal device determines the second terminal device based on the feature information of the image output device, the following steps are performed: The first terminal device obtains, through scanning, at least one additional terminal device by using a short-range communications module; and the first terminal device determines the second terminal device from the at least one additional terminal device based on the feature information of the image output device, where feature information of the second terminal device is the same as the feature information of the image output device.

In this embodiment of this application, the first terminal device may obtain, through scanning, the at least one additional terminal device by using the short-range communications module (for example, when finding that the preview image includes the image of the display, the first terminal device triggers enabling of the short-range communications module to perform scanning), and the first terminal device searches the at least one additional terminal device obtained through scanning for the second terminal device whose feature information is the same as the feature information of the display in the preview image. In this manner, the user does not need to determine a device to which the first terminal device is to connect, and the first terminal device may help the user determine a device to which the first terminal device can connect, to facilitate use by the user, and improve user experience.

In a possible design, the first prompt information includes device identifiers of a plurality of second terminal devices, and in a case in which the first terminal device connects to the second terminal device in response to an operation of triggering the first prompt information, the following steps are performed: The first terminal receives a user's selection operation of selecting one of the device identifiers of the plurality of second terminal devices; and in response to the selection operation, the first terminal device connects, to a second terminal device corresponding to the device identifier selected in the selection operation; and in a case in which the first terminal device receives the first image information sent by the second terminal device, the following steps are performed: The first terminal device receives first image information sent by the second terminal device corresponding to the selected device identifier, where the first image information includes content currently played by an image output device of the second terminal device corresponding to the selected device identifier.

In this embodiment of this application, when the first terminal device determines that there are the plurality of second terminal devices, the first terminal device may display a device identifier of each of the plurality of second terminal devices. The user may select one device identifier from the plurality of device identifiers, and trigger the device identifier, to connect to a second terminal device corresponding to the device identifier. In this manner, the first terminal device selects, based on the feature information of the display, a plurality of second terminal devices from all other terminal devices that are obtained through scanning. Feature information of the plurality of selected second terminal devices is the same as the feature information of the display in the preview image. In other words, there is a relatively high probability that the plurality of selected second terminal devices are devices to which the display in the preview image belongs. In this manner, the first terminal device helps the user narrow down a range of selecting the second terminal device, to facilitate use by the user, and improve user experience.

In a possible design, in a case in which the first terminal device displays the first image information, the following steps are performed: The first terminal device scales down the preview image, and displays the scaled-down preview image in a first display area on a display; and the first terminal device displays the first image information in a second display area on the display.

In this embodiment of this application, the first terminal device may display the first image information on a split screen. To be specific, the first terminal device displays the scaled-down preview image in an area on the display, and displays the first image information in another area on the display. In this manner, the user may view the preview image and the first image information in a comparative manner. A large meeting is used as an example. After the user starts the camera, the preview image and the first image information are displayed on split screens. The user cannot only see an onsite scenario of the meeting, but also clearly see display content played by a projector in the onsite meeting. This helps improve user experience.

In a possible design, in a case in which the first terminal device receives the first image information sent by the second terminal device, the following steps are performed: The first terminal device sends, to the second terminal device in response to an operation of triggering a photographing control, request information used to request to obtain the first image information; and the first terminal device receives the first image information sent by the second terminal device based on the request information.

In this embodiment of this application, the user of the first terminal device only needs to start the camera of the first terminal device, to display a preview image that includes a display of the second terminal device, and then triggers the photographing control to receive the first image information sent by the second terminal device. In a conventional technical solution, after a first terminal device connects to a second terminal device, a user needs to perform a series of operations on a peer device, namely, the second terminal device, to send first image information to the first terminal device by using the second terminal device (for example, send a picture to WeChat on a mobile phone by using WeChat on a computer). In comparison with a conventional technical solution, in this embodiment of this application, the user does not need to perform an operation on a peer device, namely, the second terminal device, and the operation is simple. In addition, a specific application for image transmission does not need to be installed on the first terminal device, and the image transmission can be implemented by using a camera built in the first terminal device, to facilitate an operation performed by the user, and improve user experience.

In a possible design, the first terminal device obtains a second image through photographing in response to the operation of triggering the photographing control, where the second image includes the image output device of the second terminal device; and the first terminal device correspondingly stores the second image and a third image, where the third image is an image that is sent by the second terminal device and that is received by the first terminal device in a time period from a time at which a camera is started to a time at which the first terminal device obtains the second image through photographing, or the third image is the first image; and the third image includes content played by the image output device of the second terminal device.

In this embodiment of this application, if the user triggers the photographing control, the first terminal device obtains an image (the image includes the display of the second terminal device) through photographing. In this period, the first terminal device also receives the image sent by the second terminal device. Therefore, the first terminal device may correspondingly store the image obtained through photographing and the image sent by the second terminal device, to help the user view the images.

In a possible design, the first terminal device displays the second image and second prompt information in response to a second operation triggered by the user, where the second prompt information is used to prompt the user to open the third image; and displaying, by the first terminal device, the third image in response to an operation of triggering the second prompt information.

In this embodiment of this application, the first terminal device correspondingly stores the image sent by the second terminal device and the second image obtained through photographing. If the user opens an album in the first terminal device to display the second image, the first terminal device may prompt the user to open the image sent by the second terminal device, to facilitate an operation performed by the user, and improve user experience.

According to a second aspect, an embodiment of this application provides a photographing method. The method is applicable to a first terminal device having an image shooting function, and the method includes: establishing, by the first terminal device, a connection to a second terminal device, where the first terminal device has the image shooting function, and the second terminal device includes an image output device; enabling, by the first terminal device, the image shooting function based on a first operation performed by a user, and obtaining and displaying a preview image; and receiving and displaying, by the first terminal device when the preview image includes an image of the image output device of the second terminal device, first image information sent by the second terminal device, where the first image information includes content currently played by the image output device of the second terminal device.

In this embodiment of this application, a camera is used as an example. After connecting the first terminal device to the second terminal device, the user only needs to start, through triggering, a camera in the first terminal device, to open the preview image. When a display of the second terminal device appears in the preview image, the first terminal device may display first image information that is sent by the second terminal device and that includes the display content currently played on the display of the second terminal device. In a conventional technology, after the first terminal device connects to the second terminal device, the user needs to perform a series of operations on the second terminal device, to send the first image information to the first terminal device by using the second terminal device, and then the user needs to perform a series of operations on the first terminal device again, to open and display the first image information sent by the second terminal device (for example, the user sends a picture to WeChat on a mobile phone by using WeChat on a computer). However, in the solution in this embodiment of this application, a process in which the user triggers the first terminal device to display the first image information sent by the second terminal device is relatively simple, to facilitate an operation performed by the user, and improve user experience. In addition, when photographing the display, the user can clearly obtain display content on the display without a need to consider a shooting angle or blocking of a front-row person in some display content on the display, to improve photographing efficiency of a terminal device.

In a possible design, the receiving and displaying, by the first terminal device when the preview image includes an image of the image output device of the second terminal device, first image information sent by the second terminal device includes: recognizing, by the first terminal device, the preview image, determining that the preview image includes an image output device, and determining whether feature information of the image output device matches feature information of the second terminal device, where the feature information includes a device identifier and/or a device type; when the feature information of the image output device matches the feature information of the second terminal device, sending, by the first terminal to the second terminal, request information used to request to obtain the first image information; and receiving and displaying, by the first terminal device, the first image information sent by the second terminal device based on the request information.

In this embodiment of this application, after connecting the first terminal device to the second terminal device, the user only needs to start, through triggering, a camera in the first terminal device, to open the preview image. If a display in the preview image belongs to the second terminal device, the first terminal device receives the first image information sent by the first terminal device. In this manner, when the user attempts to photograph, by using the first terminal device, the display content played on the display of the second terminal device, the first terminal device may display the first image information sent by the second terminal device, so that the user can clearly see the display content currently played by the second terminal device, to improve a photographing effect of the first terminal device, and help improve user experience.

In a possible design, the receiving and displaying, by the first terminal device when the preview image includes an image of the image output device of the second terminal device, first image information sent by the second terminal device includes: recognizing, by the first terminal device, the preview image, determining that the preview image includes an image output device, and determining whether feature information of the image output device matches feature information of the second terminal device, where the feature information includes a device identifier and/or a device type; when the feature information of the image output device matches the feature information of the second terminal device, and a user's operation of triggering a photographing control is received, sending, by the first terminal to the second terminal, request information used to request to obtain the first image information; and receiving and displaying, by the first terminal device, the first image information sent by the second terminal device based on the request information.

In this embodiment of this application, when the first terminal device determines that a display in the preview image belongs to the second terminal device, the user may trigger transmission of the first image information by using the photographing control. In this manner, the user may choose to properly receive the first image information sent by the second terminal device. For example, after the user aligns the camera with the display of the second terminal device, the first terminal device does not need to continuously receive the first image information sent by the second terminal device. When the user is interested in current display content on the display, the first image information sent by the second terminal device may be obtained only when the photographing control is triggered. In this manner, memory is saved.

In a possible design, in a case in which the first terminal device displays the first image information, the following steps are performed: The first terminal device scales down the preview image, and displays the scaled-down preview image in a first display area on a display; and the first terminal device displays the first image information in a second display area on the display.

In this embodiment of this application, the first terminal device may display the first image information on a split screen. To be specific, the first terminal device displays the scaled-down preview image in an area on the display, and displays the first image information in another area on the display. In this manner, the user may view the preview image and the first image information in a comparative manner. A large meeting is used as an example. After the user starts the camera, the preview image and the first image information are displayed on split screens. The user cannot only see an onsite scenario of the meeting, but also clearly see display content played by a projector in the onsite meeting. This helps improve user experience.

In a possible design, the first terminal device obtains a second image through photographing in response to the operation of triggering the photographing control; and the first terminal device correspondingly stores the second image and a third image, where the third image is an image that is sent by the second terminal device and that is received by the first terminal device in a time period from a time at which a camera is started to a time at which the first terminal device obtains the second image through photographing, or the third image is the first image; and the third image includes content played by the image output device of the second terminal device.

In this embodiment of this application, if the user triggers the photographing control, the first terminal device obtains an image through photographing, and in this process, the first terminal device further receives the image sent by the second terminal device. Therefore, the first terminal device may correspondingly store the image obtained through photographing and the image sent by the second terminal device, to help the user view the images.

In a possible design, the first terminal device displays the second image and second prompt information in response to a second operation triggered by the user, where the second prompt information is used to prompt the user to open the third image; and displaying, by the first terminal device, the third image in response to an operation of triggering the second prompt information.

In this embodiment of this application, the first terminal device correspondingly stores the image sent by the second terminal device and the second image obtained through photographing. If the user opens an album in the first terminal device to display the second image, the first terminal device may prompt the user to open the image sent by the second terminal device, to facilitate an operation performed by the user, and improve user experience.

According to a third aspect, an embodiment of this application provides a first terminal device, including a camera, a display, a processor, and a memory. The camera is configured to collect a preview image, the display is configured to display the preview image, and the memory is configured to store one or more computer programs. When the one or more computer programs stored in the memory are executed by the processor, the terminal device is enabled to implement the method according to any one of the first aspect or the possible designs of the first aspect, or when the one or more computer programs stored in the memory are executed by the processor, the terminal device is enabled to implement the method according to any one of the second aspect or the possible designs of the second aspect.

According to a fourth aspect, an embodiment of this application further provides a first terminal device. The first terminal device includes a module/unit that performs the method according to any one of the first aspect or the possible designs of the first aspect, or the first terminal device includes a module/unit that performs the method according to any one of the second aspect or the possible designs of the second aspect. These module/unit may be implemented by hardware, or may be implemented by hardware by executing corresponding software.

According to a fifth aspect, an embodiment of this application further provides a computer-readable storage medium. The computer-readable storage medium includes a computer program. When the computer program is run on a first terminal device, the first terminal device is enabled to perform the method according to any one of the first aspect or the possible designs of the first aspect, or when the computer program is run on a first terminal device, the terminal device is enabled to perform the method according to any one of the second aspect or the possible designs of the second aspect.

According to a sixth aspect, an embodiment of this application further provides a computer program product. When the computer program product is run on a first terminal device, the first terminal device is enabled to perform the method according to any one of the first aspect or the possible designs of the first aspect, or when the computer program product is run on a first terminal device, the first terminal device is enabled to perform the method according to any one of the second aspect or the possible designs of the second aspect.

BRIEF DESCRIPTION OF DRAWINGS

FIG. 2B is a schematic diagram of another application scenario according to an embodiment of the present invention;

FIG. 3 is a schematic flowchart of a photographing method according to an embodiment of the present invention;

DESCRIPTION OF EMBODIMENTS

The following describes technical solutions in embodiments of this application with reference to accompanying drawings in the embodiments of this application.

The following describes some terms of the embodiments of this application, to help a person skilled in the art have a better understanding.

(1) A terminal device in the embodiments of this application may also be referred to as user equipment (user equipment, UE), for example, a smartphone, a tablet, various wearable devices, or a vehicle-mounted device. Various applications (application, app for short) may be installed in the terminal device, for example, WeChat, Alipay, Tencent chat software (QQ), DingTalk, photo sharing (Instagram), KakaoTalk, and LINE (LINE).

(2) "A plurality of" in the embodiments of this application indicates "two or more".

In addition, it should be understood that in descriptions of this application, terms such as "first" and "second" are merely used for differentiation and description, but should not be understood as an indication or an implication of relative importance or an indication or implication of an order.

Figure 1:
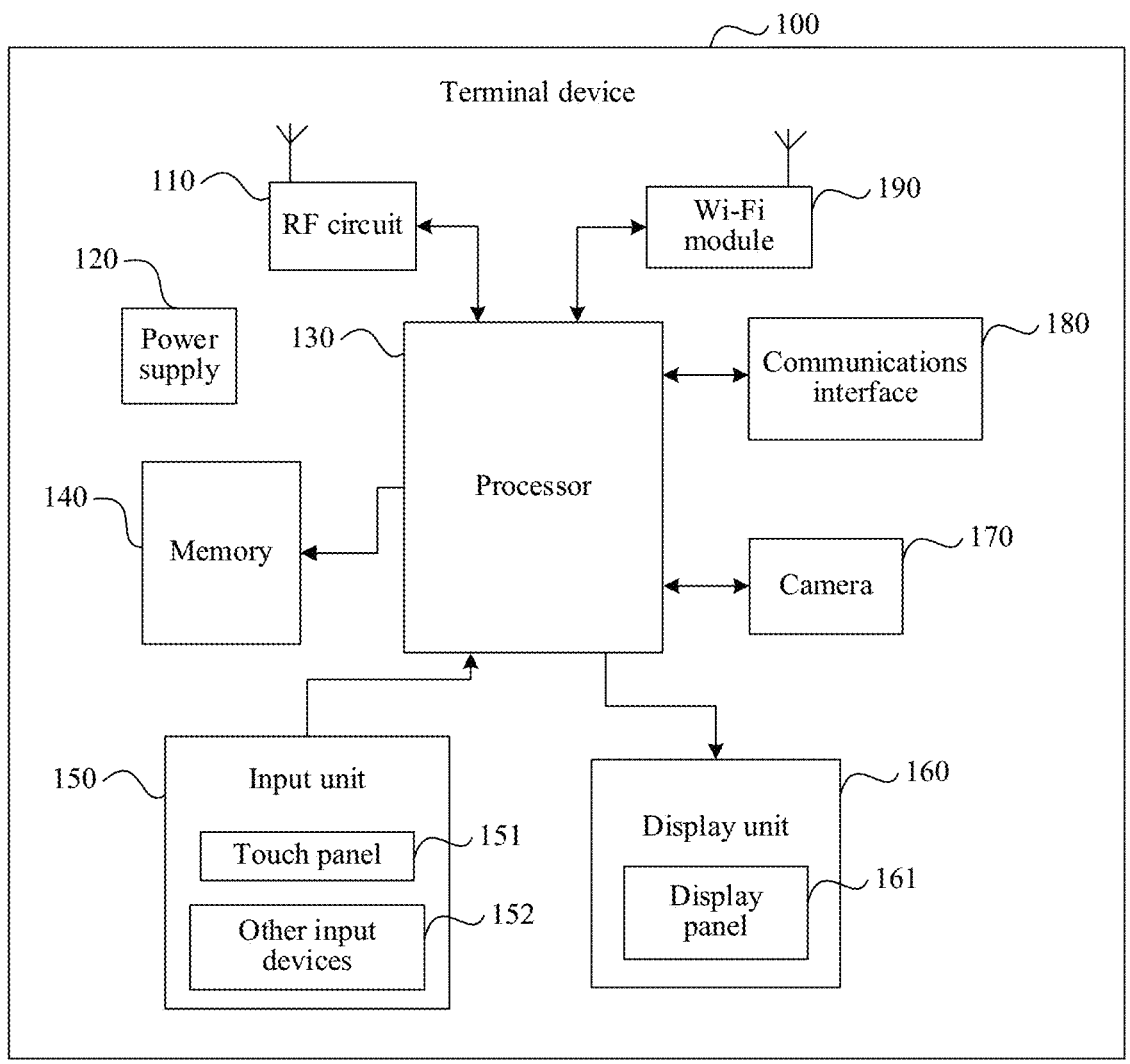
FIG. 1 is a schematic structural diagram of a terminal device according to an embodiment of the present invention.

The embodiments of this application provide a photographing method and a terminal device. The method is applicable to the terminal device. FIG. 1 is a structural diagram of a possible terminal device. Referring to FIG. 1, the terminal device 100 includes components such as a radio frequency (radio frequency, RF) circuit 110, a power supply 120, a processor 130, a memory 140, an input unit 150, a display unit 160, a camera 170, a communications interface 180, and wireless fidelity (wireless fidelity, Wi-Fi) module 190. It may be understood by a person skilled in the art that a structure of the terminal device shown in FIG. 1 does not constitute a limitation on the terminal device, and the terminal device provided in the embodiments of this application may include more or fewer components than those shown in the figure, combine some components, or have different component arrangements.

The following describes constituent components of the terminal device 100 in detail with reference to FIG. 1.

The RF circuit 110 may be configured to receive and send data in a communication or call process. Specifically, after receiving downlink data from a base station, the RF circuit 110 sends the downlink data to the processor 130 for processing, and sends to-be-sent uplink data to the base station. Usually, the RF circuit 110 includes but is not limited to an antenna, at least one amplifier, a transceiver, a coupler, a low noise amplifier (low noise amplifier, LNA), a duplexer, and the like.

In addition, the RF circuit 110 may further communicate with a network and another device through wireless communication. Any communications standard or protocol may be used for the wireless communication, including but not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), an email, short message service (short messaging service, SMS), and the like.

A Wi-Fi technology belongs to a short-range wireless transmission technology. The terminal device 100 may connect to an access point (access point, AP) by using the Wi-Fi module 190, to access a data network. The Wi-Fi module 190 may be configured to receive and send the data in the communication process.

The terminal device 100 may physically connect to the another device by using the communications interface 180. Optionally, the communications interface 180 connects to a communications interface of the another device by using a cable, to transmit the data between the terminal device 100 and the another device.

In this embodiment of this application, the terminal device 100 can implement a communication service and send information to another terminal device. Therefore, the terminal device 100 needs to have a data transmission function. In other words, a communications module needs to be included inside the terminal device 100. Although FIG. 1 shows communications modules such as the RF circuit 110, the Wi-Fi module 190, and the communications interface 180, it may be understood that the terminal device 100 includes at least one of the foregoing components or another communications module (for example, a Bluetooth module) configured to implement communication, to transmit the data.

For example, when the terminal device 100 is a mobile phone, the terminal device 100 may include the RF circuit 110, and may further include the Wi-Fi module 190; when the terminal device 100 is a computer, the terminal device 100 may include the communications interface 180, and may further include the Wi-Fi module 190; and when the terminal device 100 is a tablet, the terminal device 100 may include the Wi-Fi module.

The memory 140 may be configured to store a software program and a module. The processor 130 runs the software program and the module stored in the memory 140, to execute various function applications and data processing of the terminal device 100.

Optionally, the memory 140 may mainly include a program storage area and a data storage area. The program storage area may store an operating system, various application programs, and the like. The data storage area may store a multimedia file such as a picture or a video.

In addition, the memory 140 may include a high-speed random access memory, and may further include a nonvolatile memory, for example, at least one magnetic disk storage device, a flash memory device, or another volatile solid-state storage device.

The input unit 150 may be configured to: receive a number or feature information entered by a user, and generate key signal input related to user setting and function control of the terminal device 100.

Optionally, the input unit 150 may include a touch panel 151 and other input devices 152.

The touch panel 151, also referred to as a touchscreen, may collect a touch operation (for example, an operation performed by the user on the touch panel 151 or near the touch panel 151 by using any proper object or accessory such as a finger or a stylus) performed by the user on or near the touch panel 151, and drive a corresponding connection apparatus according to a preset program. Optionally, the touch panel 151 may include two parts: a touch detection apparatus and a touch controller. The touch detection apparatus detects a touch direction of the user, detects a signal brought by the touch operation, and transfers the signal to the touch controller. The touch controller receives touch information from the touch detection apparatus, converts the touch information into coordinates of a touch point, and sends the coordinates of the touch point to the processor 130, and can receive and execute a command sent by the processor 130. In addition, the touch panel 151 may be implemented in a plurality of types such as a resistive type, a capacitive type, an infrared type, and a surface acoustic wave type.

Optionally, the other input device 152 may include but are not limited to one or more physical keyboards, a function key (for example, a volume control key or a power on/off key), a tracking ball, a mouse, a joystick, and the like.

The display unit 160 may be configured to display information entered by the user, information provided for the user, and various menus of the terminal device 100. The display unit 160 is a display system of the terminal device 100, and is configured to present a screen to implement human-computer interaction.

The display unit 160 may include a display panel 161. Optionally, the display panel 161 may be configured in a form such as a liquid crystal display (liquid crystal display, LCD) or an organic light-emitting diode (organic light-emitting diode, OLED).

Further, the touch panel 151 may cover the display panel 161. After detecting the touch operation on or near the touch panel 151, the touch panel 151 transfers the touch operation to the processor 130 to determine a type of a touch event. Subsequently, the processor 130 provides corresponding visual output on the display panel 161 based on the type of the touch event.

Although in FIG. 1, the touch panel 151 and the display panel 161 serve as two independent components to implement input and output functions of the terminal device 100. However, in some embodiments, the touch panel 151 may be integrated into the display panel 161 to implement the input and output functions of the terminal device 100.

The processor 130 is a control center of the terminal device 100, connects to the components by using various interfaces and lines, and runs or executes the software program and/or the module stored in the memory 140 and invokes the data stored in the memory 140, to perform various functions of the terminal device 100 and process the data, and implement a plurality of services based on the terminal device.

Optionally, the processor 130 may include one or more processing units. Optionally, the processor 130 may integrate an application processor and a modem processor. The application processor mainly processes an operating system, a user interface, an application, and the like. The modem processor mainly processes the wireless communications. It may be understood that the modem processor may alternatively not be integrated into the processor 130.

The camera 170 is configured to implement a shooting function of the terminal device 100, to shoot a picture or a video. The camera 170 may further be configured to: implement a scanning function of the terminal device 100, and scan a to-be-scanned object (a two-dimensional code/bar code).

The terminal device 100 further includes the power supply 120 (such as a battery) configured to supply power to the components. Optionally, the power supply 120 may logically connect to the processor 130 by using a power management system, to implement functions such as charge management, discharge management, and power consumption management by using the power management system.

Although not shown, the terminal device 100 may further include at least one sensor, an audio circuit, and the like. Details are not described herein.

The embodiments of this application provide a photographing method and a terminal device. The method relates to two terminal devices. A first terminal device has an image shooting function, for example, a mobile phone, an iPad, or a camera. A second terminal device includes a device that has a display, for example, a television set, a desktop computer, or a notebook computer, or includes a projector. The first terminal device establishes a connection to the second terminal device. The first terminal device displays a preview screen after enabling an image shooting function, and first image information sent by the second terminal device is displayed on the preview screen. When the second terminal device is the device having a display, the first image information includes display content currently displayed on the display of the second terminal device. When the second terminal device is the projector, the first image information includes display content projected by the projector. According to the technical solutions provided in the embodiments of this application, if a user needs to photograph display content on a screen (including a display, a screen or a wall onto which display content is projected by the projector, or the like) by using the first terminal device, the user can clearly photograph the display content on the screen without considering a photographing angle, a photographing distance, or a block to the display content. Therefore, user experience is improved.

Before the photographing method in the embodiments of this application is described, an application scenario to which the embodiments of this application are applicable is first described. For example, FIG. 2A and FIG. 2B are schematic diagrams of two application scenarios according to the embodiments of this application.

Figure 2A:
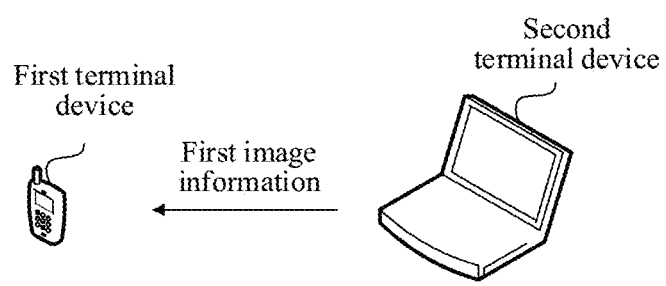
FIG. 2A is a schematic diagram of an application scenario according to an embodiment of the present invention.

In FIG. 2A, that the first terminal device is a mobile phone and the second terminal device is a notebook computer is used as an example. In this application scenario, a connection is established between the mobile phone and the notebook computer. After the mobile phone enables an image shooting function, the mobile phone displays a preview image. The preview image includes first image information sent by the notebook computer, and the first image information includes display content currently displayed on the display.

In FIG. 2B, that the first terminal device is a mobile phone and the second terminal device is a notebook computer that connects to a projector is used as an example. The notebook computer projects display content on a display onto a screen (or a wall) by using the projector. In this application scenario, if the projector has a connection function such as Wi-Fi or Bluetooth, the mobile phone may establish a connection to the projector, and the projector sends, to the mobile phone, the display content currently projected onto the screen. If the projector has no connection function such as Wi-Fi or Bluetooth, the mobile phone may establish a connection to the notebook computer that connects to the projector. After the mobile phone enables an image shooting function to photograph the display content projected onto the screen, the mobile phone displays a preview image. The preview image includes first image information sent by the notebook computer, and the first image information includes the display content on the display of the notebook computer, namely, the display content currently projected by the projector onto the screen.

FIG. 3 is a flowchart of a photographing method according to an embodiment of this application. Two terminal devices in this embodiment of this application may be applied to the terminal device 100 shown in FIG. 1. As shown in FIG. 3, a procedure of the method includes the following steps.

S301: A first terminal device establishes a connection to a second terminal device, where the first terminal device has an image shooting function, the second terminal device may be a terminal device having a display, for example, a mobile phone, an iPad, a television set, a desktop computer, or a notebook computer, or the second terminal device may be a projector.

In this embodiment of this application, the two terminal devices establish the connection in a plurality of manners, for example, a wireless connection manner such as Bluetooth or Wi-Fi, or a wired connection manner such as a data cable connection. For example, in the application scenario shown in FIG. 2A or FIG. 2B, the mobile phone may connect to the notebook computer by using Wi-Fi. In other words, the notebook computer sends the first image information to the mobile phone by using Wi-Fi.

In an example, the first terminal device is a mobile phone. A user may implement a connection between the mobile phone and the second terminal device by using a settings option on the mobile phone.

Figure 4A:
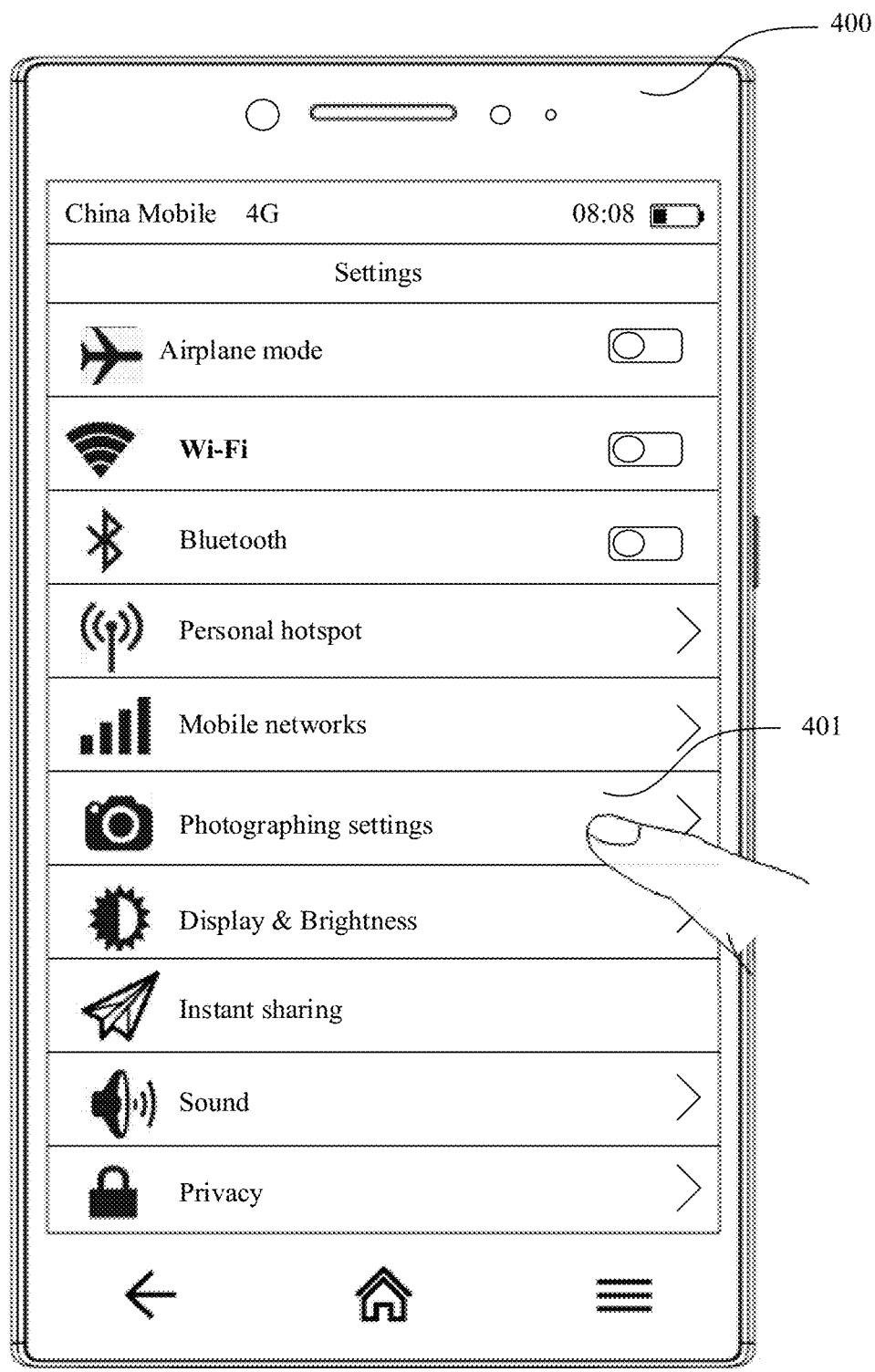
FIG. 4A is a schematic diagram of a display state of a display of a mobile phone according to an embodiment of the present invention.
Figure 4B:
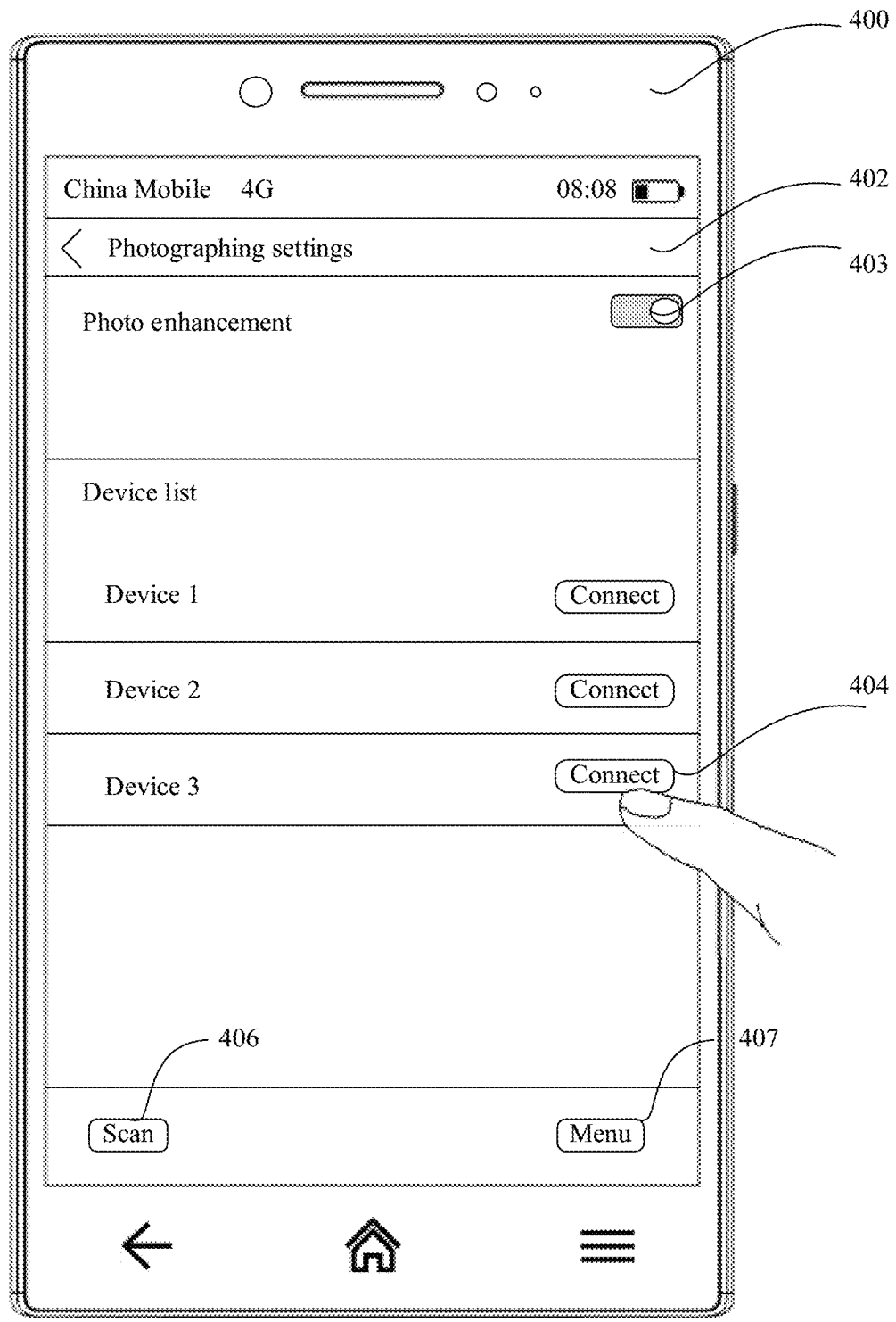
FIG. 4B is a schematic diagram of a display state of a display of a mobile phone according to an embodiment of the present invention.
Figure 4C:
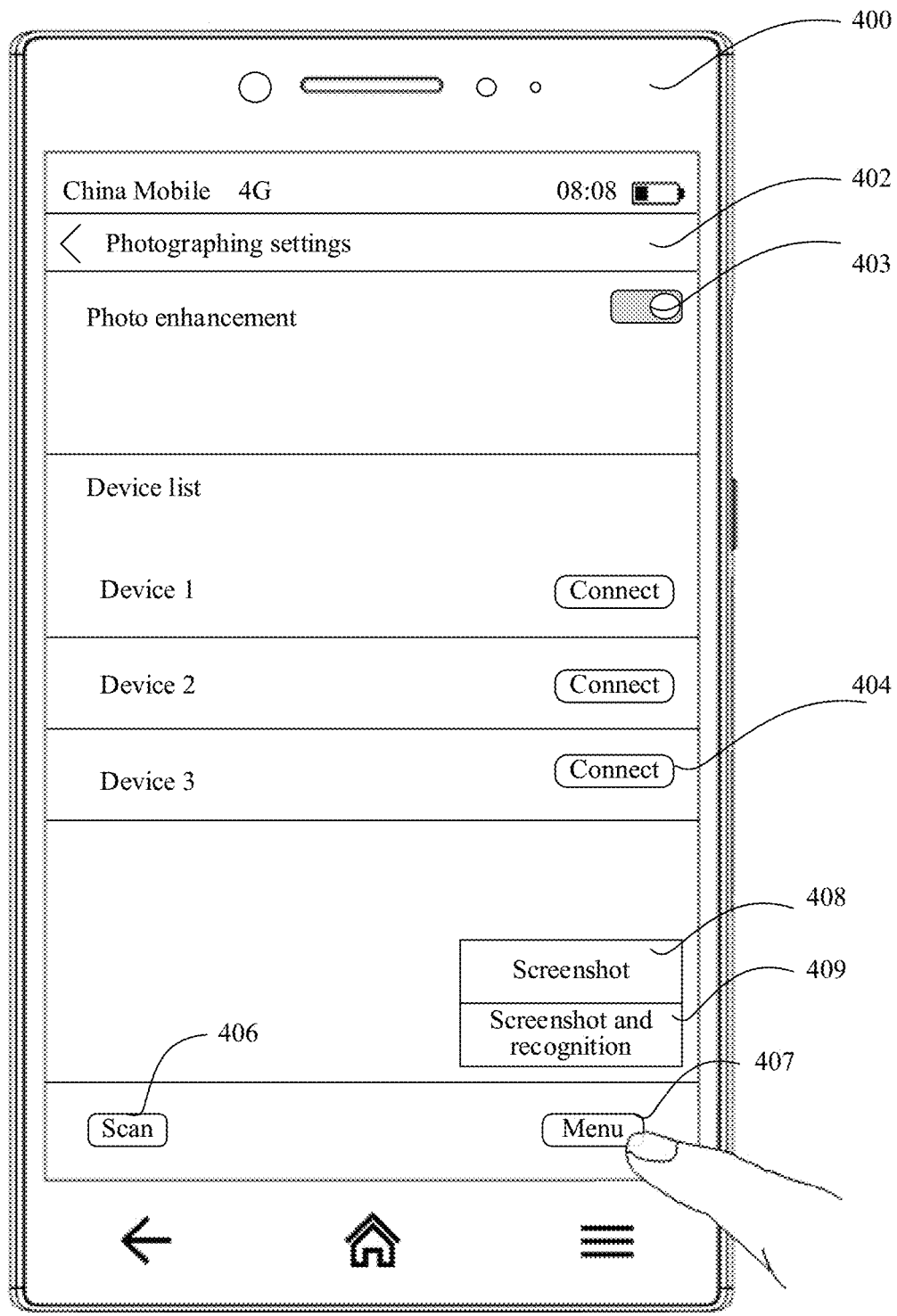
FIG. 4C is a schematic diagram of a display state of a display of a mobile phone according to an embodiment of the present invention.

For example, FIG. 4A to FIG. 4C are schematic diagrams of "Settings" screens on a mobile phone. As shown in FIG. 4A, a "Photographing settings" option 401 is displayed on the "Settings" screen on the mobile phone 400. After the user activating the "Photographing settings" option 401, the mobile phone 400 enters a setting screen 402 of "Photographing settings", as shown in FIG. 4B.

It should be noted that the "Photographing settings" option 401 in this embodiment of this application may also be referred to as another name, for example, cooperative photographing. This is not limited in this embodiment of this application.

As shown in FIG. 4B, an on/off control 403 for "Photo enhancement" is displayed on the setting screen 402 of "Photographing settings" (similarly, "Photo enhancement" in this embodiment of this application may also have another name). The mobile phone 400 disables a photo enhancement function by default. To be specific, a slider of the on/off control 403 is on a left side. After the user activates the on/off control 403, the slider of the on/off control 403 moves rightward, and a color is displayed on the left side of the on/off control 403. In other words, the mobile phone 400 has enabled the photo enhancement function. The photo enhancement function may take effect in an app that has an image shooting function and that is installed in the mobile phone 400.

In an example, after the mobile phone 400 enables the photo enhancement function, the photo enhancement function takes effect in all apps that have an image shooting function and that are installed in the mobile phone 400.

Still as shown in FIG. 4B, after the user activates the on/off control 403, the mobile phone 400 further displays a device list on a display of the mobile phone 400. The device list includes device identifiers of three devices: a device 1, a device 2, and a device 3, and a connection control corresponding to each device identifier. After the user triggers a connection control 404 corresponding to the device 3, the mobile phone 400 establishes a connection to the device 3. For example, after the user triggers the connection control 404, the mobile phone 400 sends, to the device 3, first request information used to request to establish the connection. After the device 3 receives the first request information, if the device 3 agrees to establish the connection with the mobile phone 400, the device 3 feeds back, to the mobile phone 400, feedback information indicating that the device 3 agrees to establish the connection.

As shown in FIG. 4B, the setting screen 402 of the "Photographing settings" further includes a "Scan" control 406 and a "Menu" control 407. When the user triggers the "Scan" control 406, scanning is performed on a device around the mobile phone 400. When the user triggers the "Menu" control 407, the mobile phone 400 displays a menu option. As shown in FIG. 4C, menu options include an identifier 408 of "Screenshot" and an identifier 409 of "Screenshot and recognition". "Screenshot" and "Screenshot and recognition" are to be described below.

Certainly, to improve security, after detecting an operation of triggering the connection control 404, the mobile phone 400 may further display a password entering dialog box. When detecting that a password is entered in the password entering dialog box, the mobile phone 400 sends, to the device 3, the first request information used to request to establish the connection, where the first request information may carry the password entered in the password entering dialog box.

After receiving the first request information, the device 3 verifies the password included in the first request information. If the verification succeeds, the device 3 sends, to the mobile phone 400, the feedback information indicating that the device 3 agrees to establish the connection. For example, the device 3 locally stores a password, and the device 3 compares the received password with the locally stored password. If the passwords are the same, the verification succeeds. Alternatively, a server stores a device identifier and a password of each device (the devices 1 to 3). The mobile phone 400 sends, to the server, the first request information used to request to establish the connection, where the first request information carries a device identifier and a password of the device 3. After receiving the first request information, the server compares the password in the first request information with the stored password of the device 3. If the passwords are the same, the server sends, to the device 3, an indication indicating that the verification succeeds, and the device 3 sends, to the mobile phone 400, the feedback information indicating that the device 3 agrees to establish the connection.

In another example, after the mobile phone 400 enables the photo enhancement function, the photo enhancement function takes effect in some apps that have an image shooting function and that are installed in the mobile phone 400.

Usually, there are a plurality of apps that have an image shooting function in the mobile phone, for example, a built-in camera, or a third-party app installed in the mobile phone, for example, BeautyCam, Filter master, Beauty camera, WeChat, Alipay, Tencent chat software (QQ), DingTalk, photo sharing (Instagram), KakaoTalk, and LINE (Line). Therefore, in this embodiment of this application, the user may choose an app for which the photo enhancement function is enabled in the mobile phone. For example, when using BeautyCam, if the user does not want to enhance a photo, the user may choose to disable the photo enhancement function for BeautyCam.

Figure 4D:
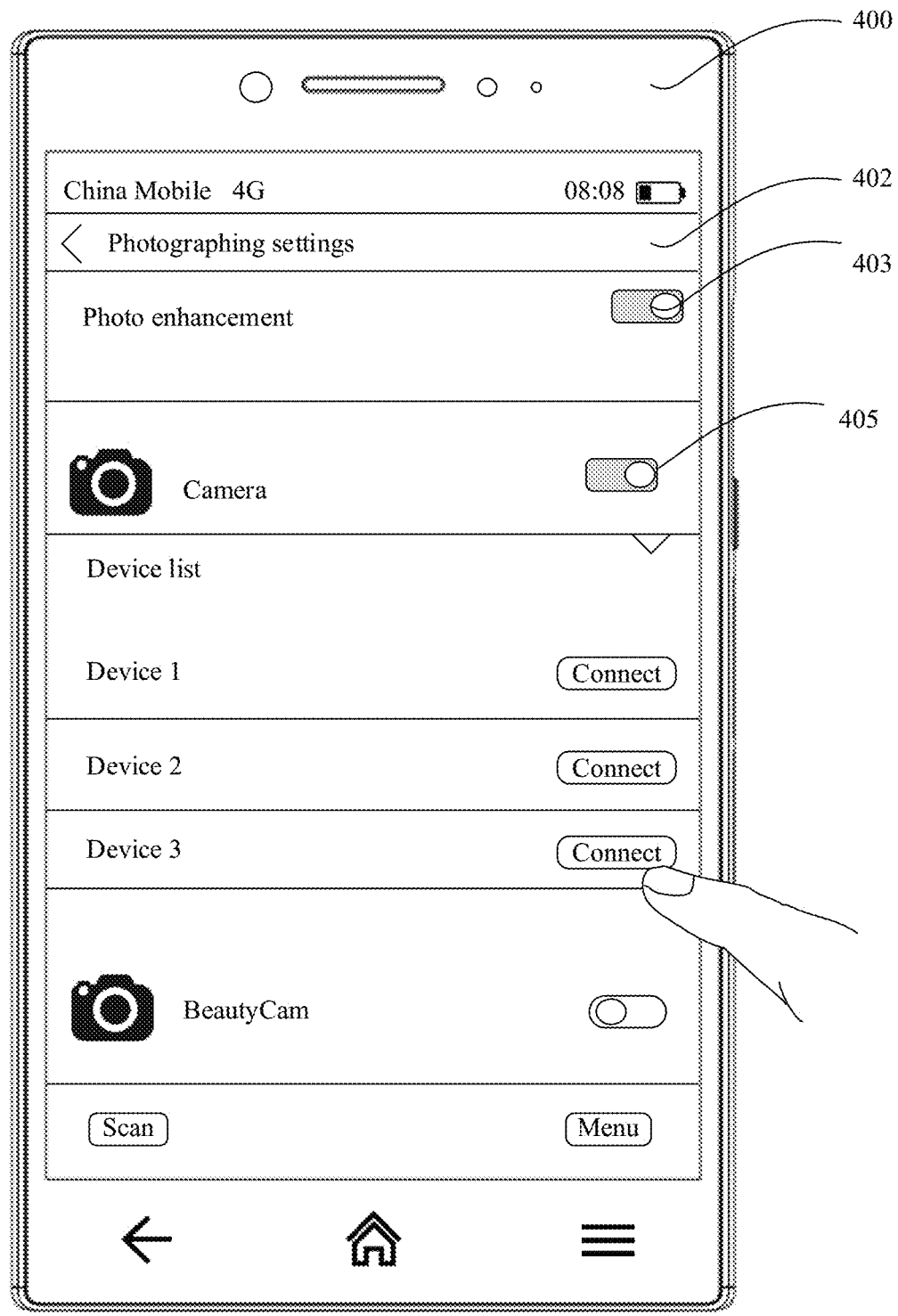
FIG. 4D is a schematic diagram of a display state of a display of a mobile phone according to an embodiment of the present invention.

In an example, after the user activates the on/off control 403 of the photo enhancement function, the mobile phone 400 may display a screen on the display of the mobile phone 400, as shown in FIG. 4D. In FIG. 4D, the setting screen 402 of "Photographing settings" includes Camera, BeautyCam, and on/off controls respectively corresponding to Camera and BeautyCam. If the user selects Camera, the user may trigger an on/off control 405 corresponding to Camera. The mobile phone 400 displays a device list, and the user may select a device that is in the device list and to which a connection is to be established, for example, select a device 3. When running Camera, the mobile phone 400 uses the photo enhancement function, and interacts with the device 3. The device list may alternatively be collapsed.

Certainly, the user may also enable the photo enhancement function in another manner. The following lists other three manners of enabling the photo enhancement function.

In an example, the mobile phone may display, on the display, a shortcut icon used to set the photo enhancement function. For example, the mobile phone detects a swipe-up operation of the user on the display, and displays a control center screen. The control center screen includes the shortcut icon used to set the photo enhancement function. When the user triggers the shortcut icon, the mobile phone enables the photo enhancement function (the photo enhancement function takes effect in all apps that have an image shooting function and that are installed in the mobile phone 400), or when the user triggers the shortcut icon, the mobile phone displays a setting screen shown in FIG. 4D, and the user selects, on the setting screen, an app for which the photo enhancement function is to be enabled.

Figure 5:
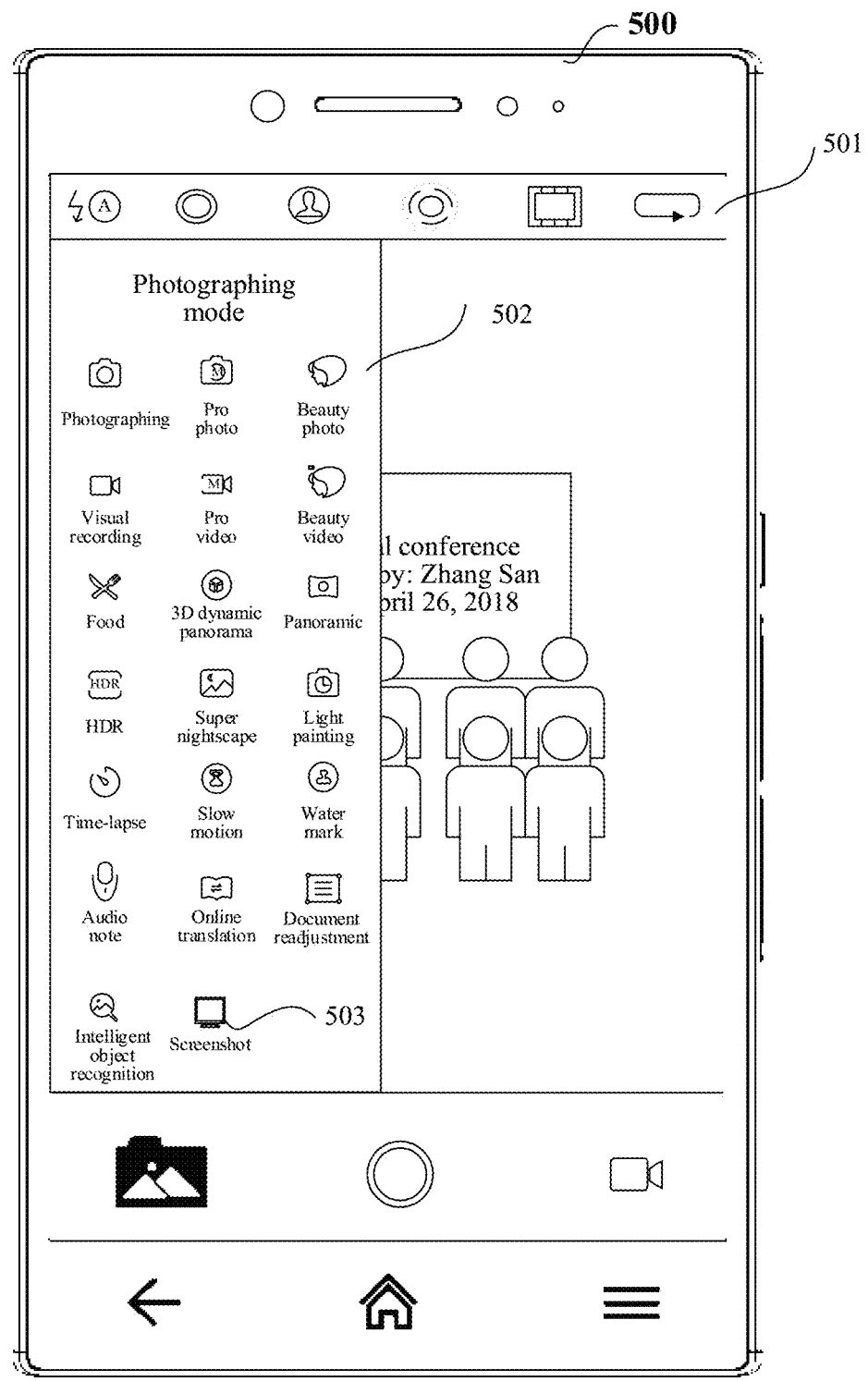
FIG. 5 is a schematic diagram of a display state of a display of a mobile phone according to an embodiment of the present invention.

In another example, after the mobile phone enables the image shooting function, identifier information for setting the photo enhancement function is displayed on a preview screen. When the user triggers the identifier information, a display screen of the mobile phone is switched to the setting screen shown in FIG. 4A or FIG. 4B, and the user enables the photo enhancement function on the setting screen. As shown in FIG. 5, after the user starts a camera in a mobile phone 500, a preview screen 501 is displayed on a display of the mobile phone 500, a mode selection screen 502 is displayed on the preview screen 501, and an identifier 503 of "Screenshot mode" is included on the mode selection screen 502. When the mobile phone 500 detects that the user triggers the identifier 503, a display screen of the mobile phone 500 is switched to the setting screen shown in FIG. 4A or FIG. 4B.

In still another example, the first terminal device enables the image shooting function, and displays a preview screen. The preview screen includes a preview image, and the first terminal device may recognize the preview image. If the first terminal device recognizes that the preview image includes a display, the first terminal device outputs prompt information, and the prompt information is used to prompt the user to set a screenshot mode. The first terminal device switches the preview screen to the setting screen shown in FIG. 4A or FIG. 4B in response to an operation of triggering the prompt information. In an actual operation process, the user may forget that a camera has a screenshot function, or the user is unfamiliar with a manner of using the screenshot function. In this manner, the user can be guided to obtain a clear image through photographing by using the screenshot function. Therefore, user experience is improved.

Figure 6:
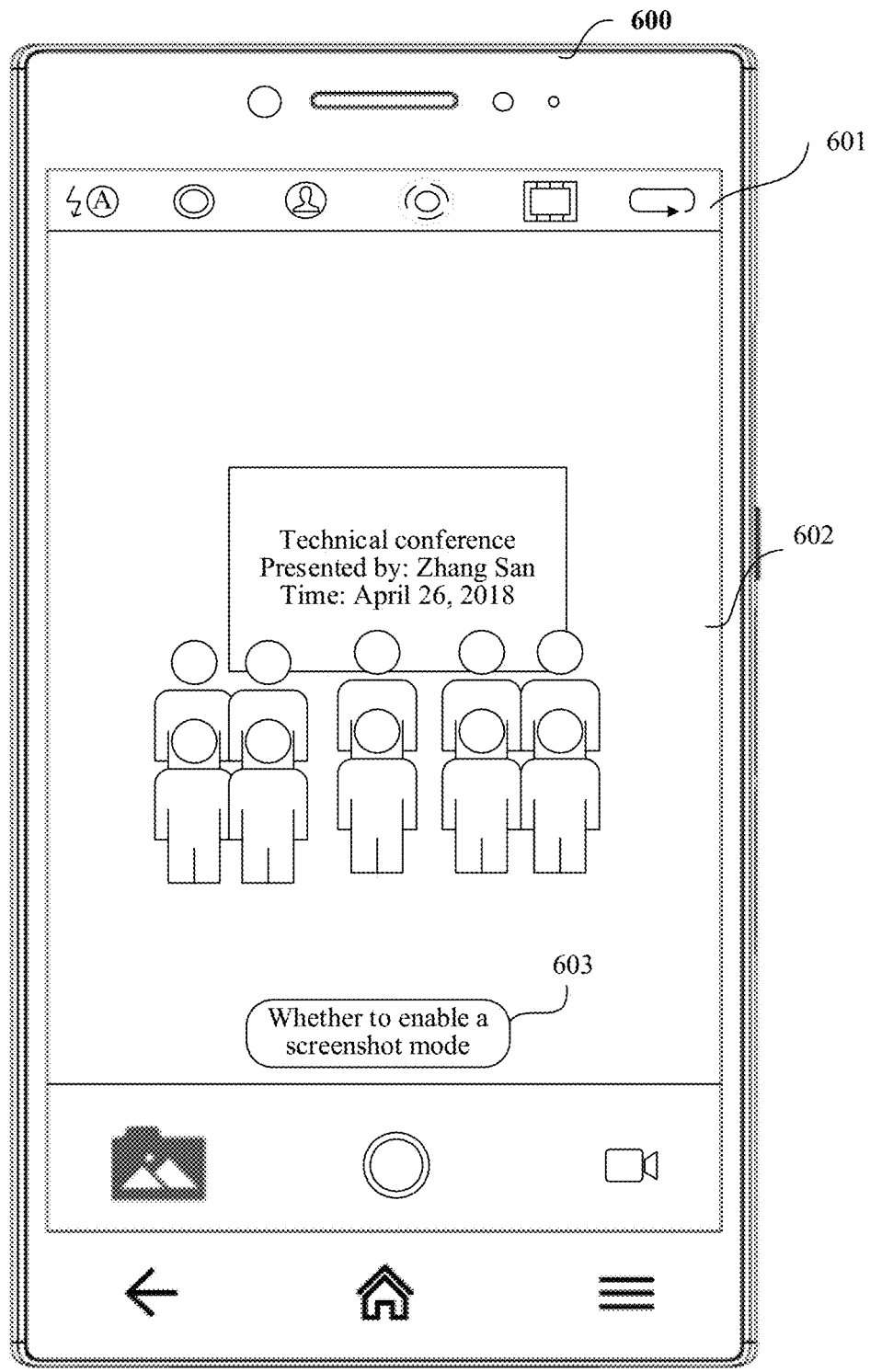
FIG. 6 is a schematic diagram of a display state of a display of a mobile phone according to an embodiment of the present invention.

As shown in FIG. 6, a mobile phone 600 opens a camera application, starts a camera, displays a preview screen 601, and displays a preview image 602 on the preview screen. The mobile phone 600 has recognized that the preview image 602 includes a display, and displays prompt information 603 on the preview screen 601. The prompt information 603 is used to indicate, to the user, whether to enable a screenshot mode. If the user triggers the prompt information 603, a display screen of the mobile phone 600 is switched to the setting screen shown in FIG. 4A or FIG. 4B, so that the user establishes, on the setting screen, a connection relationship between the mobile phone 600 and another terminal device.

In actual application, the first terminal device may also enable the photo enhancement function in another manner. This is not limited in this embodiment of this application.

S302: The first terminal device enables the image shooting function, and displays the preview screen, where the preview screen includes first image information sent by the second terminal device, and the first image information is content currently played by an image output device of the second terminal device. Specifically, when the second terminal device is a device that has a display, the first image information includes image information or text information currently played on the display of the second terminal device; or when the second terminal device is a projector, the first image information includes display content currently projected by the projector. For example, the second terminal device may pack current image data or text data of the image output device (for example, the display or a projection screen) of the second terminal device and an arrangement of the image data and the text data into the first image information, and send the first image information to the first terminal device, so that the first terminal device can display the image data and the text data according to the arrangement after receiving the first image information. Certainly, the second terminal device may alternatively take a screenshot of the content displayed on the image output device, use the screenshot as the first image information, and send the first image information to the first terminal device. In this case, the first image information is a static picture. After receiving the picture, the first terminal device displays the picture on the preview screen.

In an example, after the first terminal device successfully connects to the second terminal device, the second terminal device starts to send the first image information to the first terminal device. FIG. 4B is used as an example. After detecting the user's operation of triggering the connection control 404, the mobile phone sends the first request information to the device 3. After receiving the first request information, if the device 3 agrees to establish the connection, the device 3 takes a screenshot of content currently displayed on a display, and then directly sends, to the mobile phone, the first image information obtained by taking the screenshot.

In another example, after the first terminal device successfully connects to the second terminal device, the first terminal device may send second request information to the second terminal device. If the second terminal device is the device that has the display, the second request information is used to request to obtain the display content currently displayed on the display. After receiving the second request information, the second terminal device takes a screenshot of the current display content on the display, and then sends, to the first terminal device, the first image information obtained by taking the screenshot. If the second terminal device is the projector, the second request information is used to request to obtain the projected display content. After receiving the second request information, the projector sends the projected display content to the first terminal device.

The following describes several possible cases in which the first terminal device sends the second request information to the second terminal device.

In an example, the first terminal device sends the second request information to the second terminal device in response to an operation of enabling the image shooting function. In this manner, when the user enables the image shooting function of the first terminal device, the first terminal device sends the second request information to the second terminal device.

The scenario shown in FIG. 3A is used as an example. After the mobile phone connects to the notebook computer, when detecting that the user triggers a camera icon displayed on the mobile phone, the mobile phone sends, to the notebook computer, second request information used to request to obtain the content currently displayed on the display.

In still another example, the first terminal device displays the preview screen in response to the operation of enabling the image shooting function, and the preview screen includes an identifier (an icon or a text) of "Screenshot mode". The first terminal device sends the second request information to the second terminal device in response to a user's operation of triggering the identifier of "Screenshot mode". In this manner, when the user enables the image shooting function of the first terminal device, the first terminal device has not sent the second request information to the second terminal device; and the first terminal device sends the second request information to the second terminal device only after the user enables "Screenshot mode".

Still as shown in FIG. 5, the preview screen 501 is displayed on the display of the mobile phone 500, and the preview screen 501 includes the identifier 503 of "Screenshot mode". When detecting that the user triggers the identifier 503, the mobile phone 500 sends, to the second terminal device, the second request information used to request to obtain current display content on a display.

In still another example, still as shown in FIG. 4C, when the mobile phone detects a user's operation of triggering the identifier 408 of "Screenshot" or a user's operation of triggering the identifier 409 of "Screenshot and recognition", the first terminal device sends the second request information to the second terminal device.

In this embodiment of this application, after receiving the second request information sent by the first terminal device, the second terminal device may send the first image information to the first terminal device according to a specific period. Alternatively, if the second terminal device detects that the display content on the display remains unchanged all the time, the second terminal device may not send the first image information to the first terminal device. After detecting that the display content on the display changes, the second terminal device takes a screenshot of changed display content, and sends, to the first terminal device, an image obtained by taking the screenshot. Therefore, in this embodiment of this application, the first image information is an image set, and all images in the set are different. The second terminal device may send the first image information to the first terminal device in real time. In other words, the user may view, by using the preview screen displayed by the first terminal device, complete display content presented on the display of the second terminal device.

When detecting a user's operation of triggering the photographing control on the preview screen, the first terminal device sends, to the second terminal device, indication information for stopping sending the first image information. After receiving the indication information, the second terminal device stops sending the first image information to the first terminal device. According to the technical solution provided in this embodiment of this application, the user does not need to worry about a case in which the complete display content cannot be photographed due to a shooting angle or a block to the display content from a front-row person. In this solution, the display content played by a display device in a slideshow manner or the like can be clearly photographed. Therefore, a photographing effect of a shooting function of the terminal device is improved, and user experience is improved.

In this embodiment of this application, the first terminal device may display the first image information on the preview screen in a plurality of display manners. In an example, the preview screen of the first terminal device is displayed in a split-screen display manner. To be specific, the preview screen is split into two display areas, a preview image collected by a camera is displayed in a first display area, and the first image information sent by the second terminal device is displayed in a second display area. Certainly, the user may alternatively switch the preview screen in a split-screen display mode to a screen for displaying only the first image information sent by the second terminal device or displaying only the preview image collected by the camera.

Figure 7A:
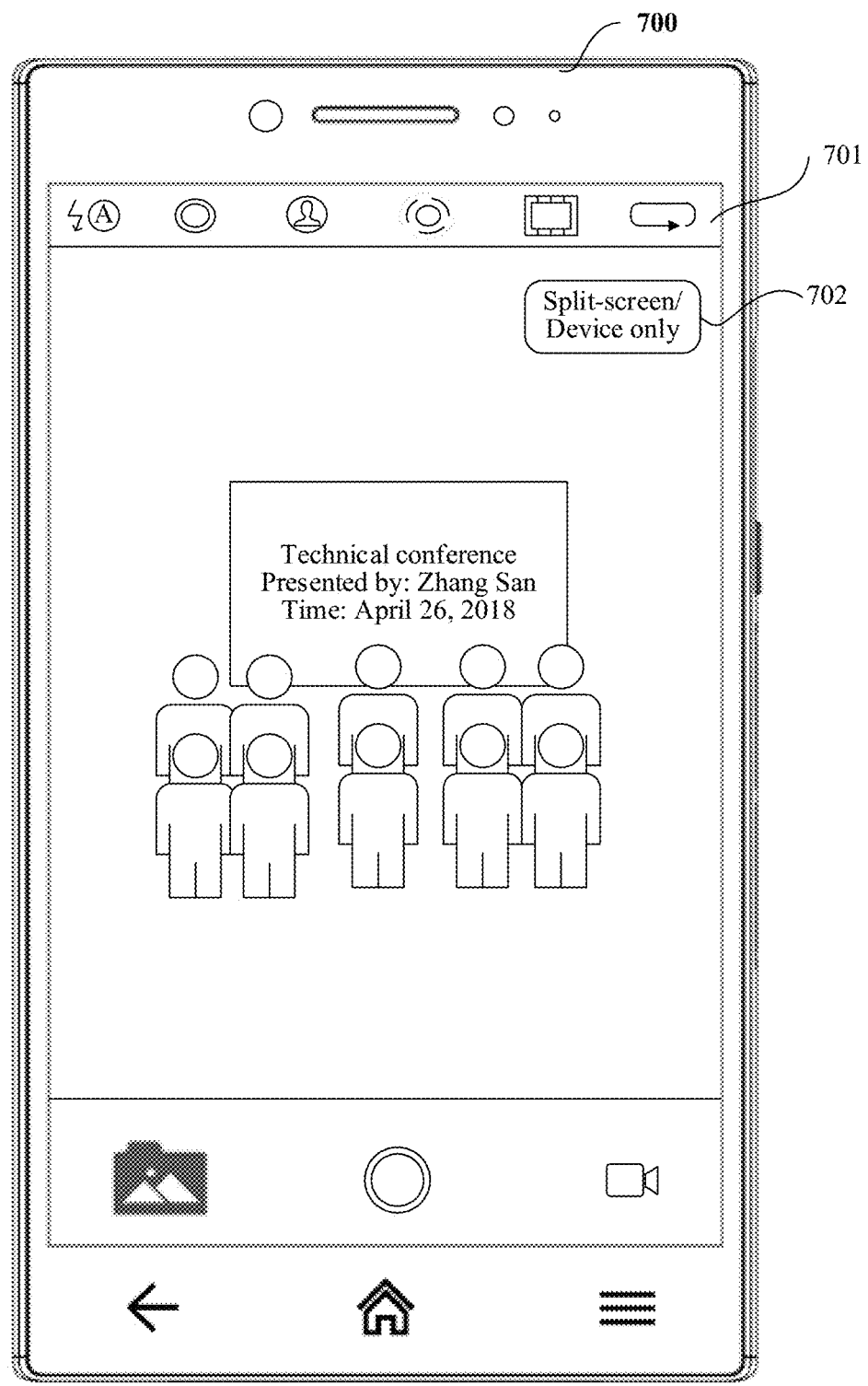
FIG. 7A is a schematic diagram of a display state of a display of a mobile phone according to an embodiment of the present invention.
Figure 7B:
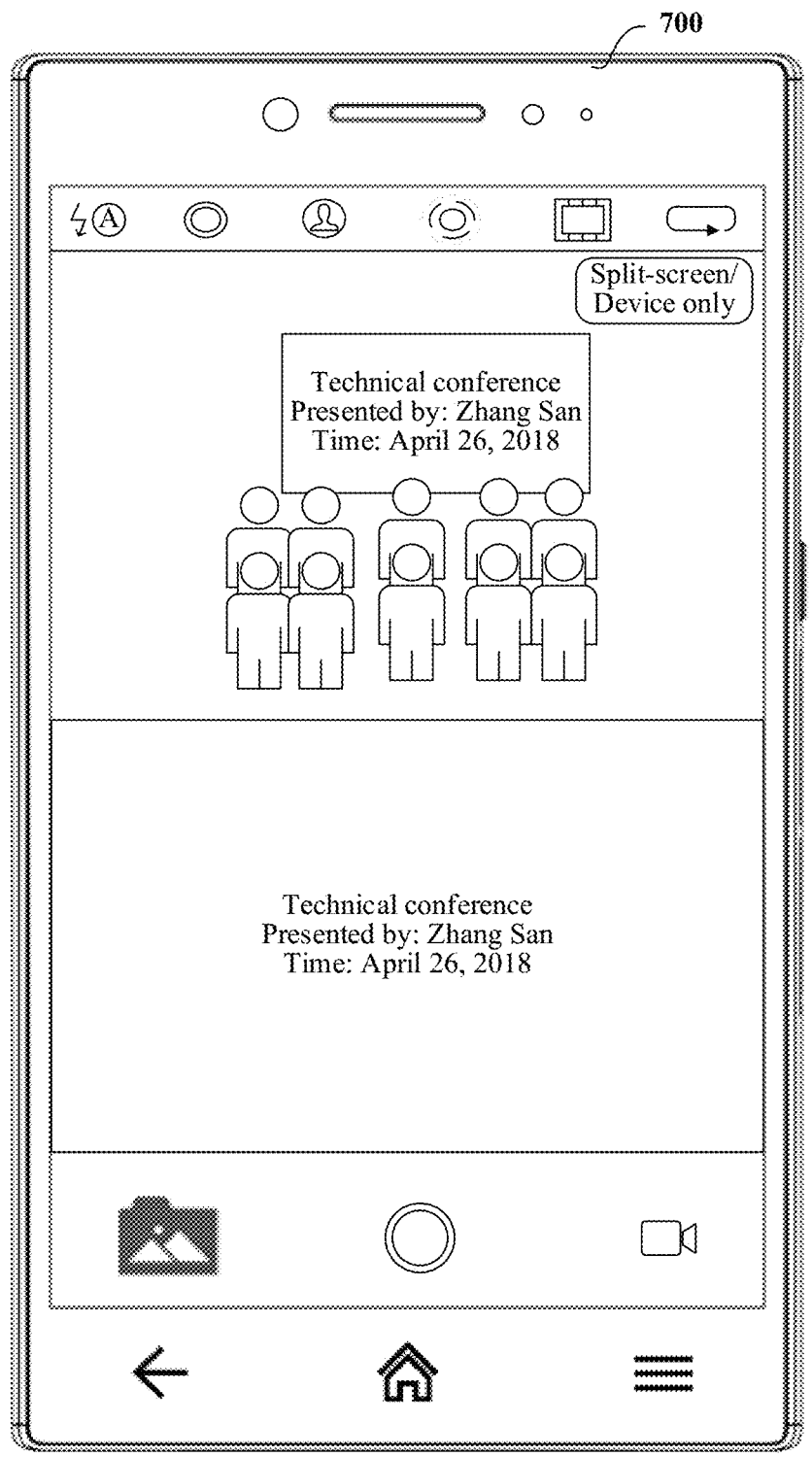
FIG. 7B is a schematic diagram of a display state of a display of a mobile phone according to an embodiment of the present invention.

For example, FIG. 7A and FIG. 7B are schematic diagrams of display states of a display of a mobile phone.

In FIG. 7A, a preview screen 701 is displayed on a display of a mobile phone 700, a preview image collected by a camera and a "Split-screen/Device only" control 702 are displayed on the preview screen 701. The control 702 is used to switch between a split-screen display mode and a mode in which only the first image information sent by the second terminal device is displayed. For example, when the control 702 is triggered and in an on state or a first color is displayed for the control 702, the mobile phone 700 displays only the first image information sent by the second terminal device. In FIG. 7B, when the control 702 is triggered and is in an off state or a second color is displayed for the control 702, the mobile phone 700 performs split-screen display. As shown in FIG. 7B, the display of the mobile phone is split into two display areas. The preview image collected by the camera is displayed in an upper display area, and the first image information sent by the second terminal device is displayed in a lower display area. For example, during split-screen display, the mobile phone may first scale down the preview image, and display the scaled-down preview image in the upper display area. Certainly, the mobile phone may alternatively display the preview image on the display, and then display the first image information in the lower display area. In other words, the first image information covers a part of the preview image.

When the split-screen display is performed, if the user triggers the photographing control, the first terminal device obtains two images. One is an image collected by the camera, and the other is an image sent by the second terminal device. When only the first image information sent by the second terminal device is displayed, if the user triggers the photographing control, the first terminal device obtains one image, namely, the image sent by the second terminal device, or the first terminal device may obtain two pictures, but only display the image sent by the second terminal device.

It can be learned from the foregoing content that because the second terminal device sends the first image information to the first terminal device in real time, the first terminal device may receive a plurality of images sent by the second terminal device. After detecting a user's operation of triggering the photographing control, the first terminal device may store a plurality of images, to help the user view the images. For example, in a photographing process, the second terminal device sends five pieces of first image information to the first terminal device in total. When the user triggers the photographing control, the first terminal device stores all the five images. Certainly, after detecting the user's operation of triggering the photographing control, the first terminal device may alternatively store only the last image sent by the second terminal device, and delete other images, to save memory space.

In this embodiment of this application, if the first terminal device stores both an image (referred to as an image 1 below) collected by the camera that performs photographing and a plurality of received images (referred to as images 2 below), the first terminal device may establish a mapping relationship between a first storage location of the image 1 and a second storage location of the images 2. When detecting that the image 1 is currently displayed on the display, the first terminal device may display prompt information on the display, and the prompt information is used to indicate, to the user, that the first terminal device stores the images 2. When the user triggers the prompt information, the first terminal device determines the second storage location of the images 2 based on the mapping relationship, and opens the images 2.

For example, FIG. 8(a) to FIG. 8(d) are a schematic diagram of display states of a display of a mobile phone.

Figure 8A:
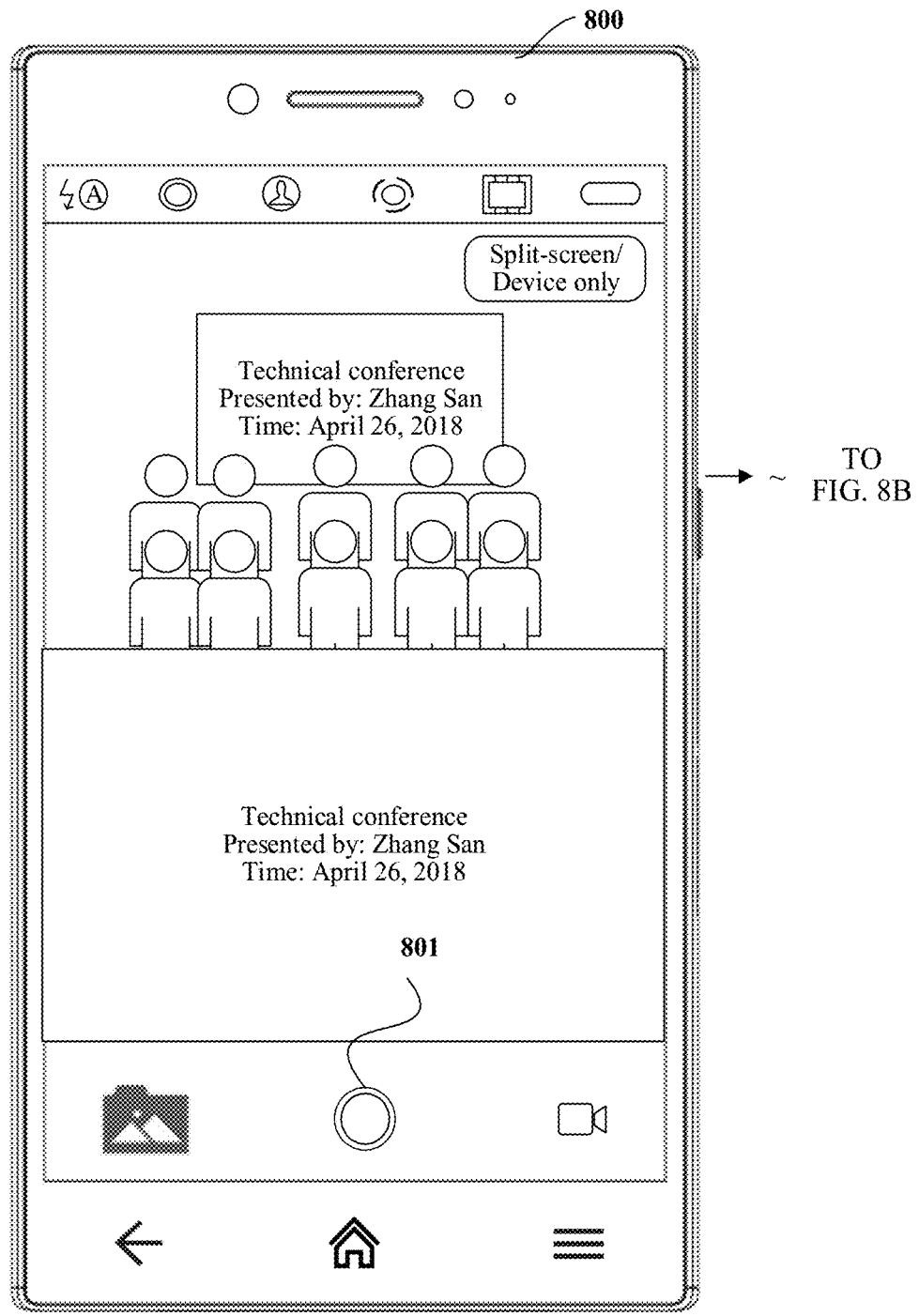
FIG. 8(a) to FIG. 8(d) are a schematic diagram of display states of a display of a mobile phone according to an embodiment of the present invention.
Figure 8B:
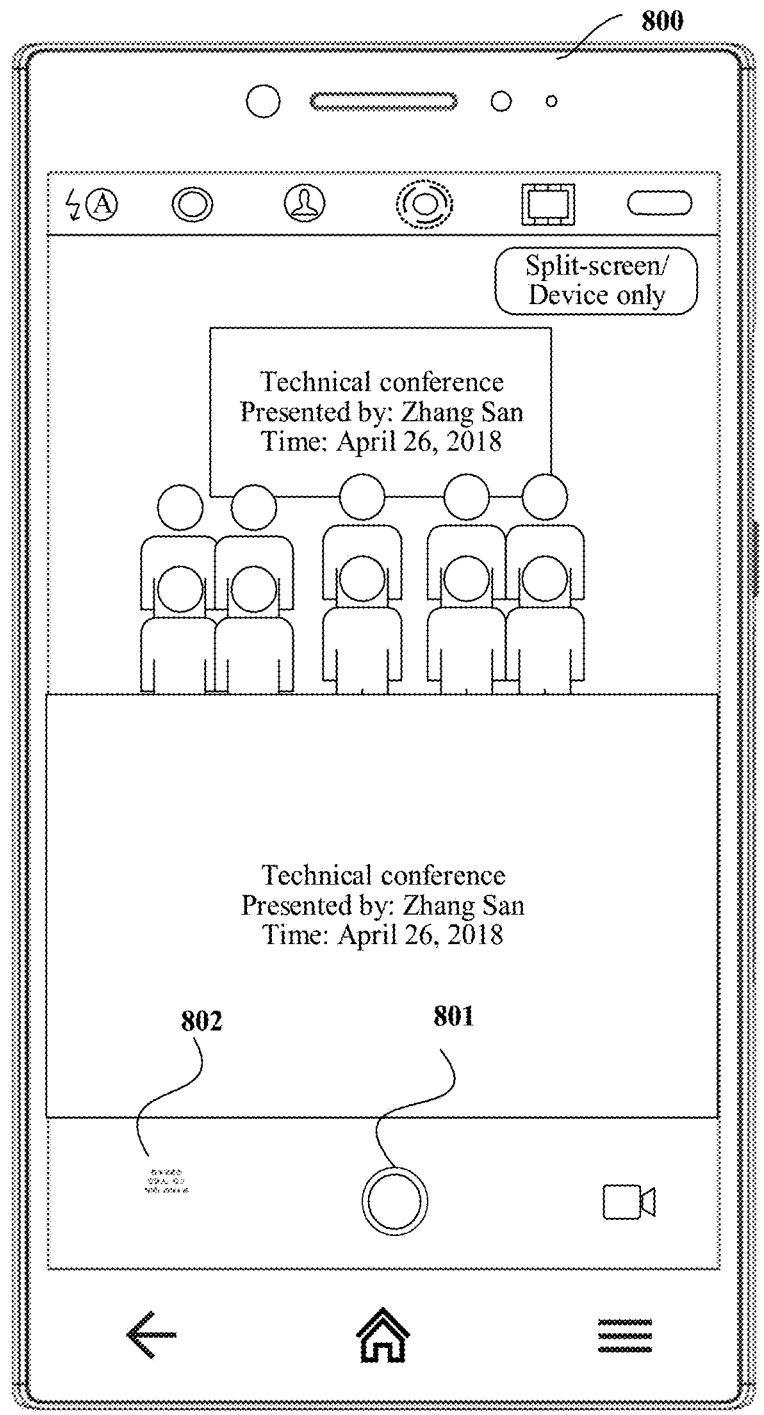
Figure 8C:
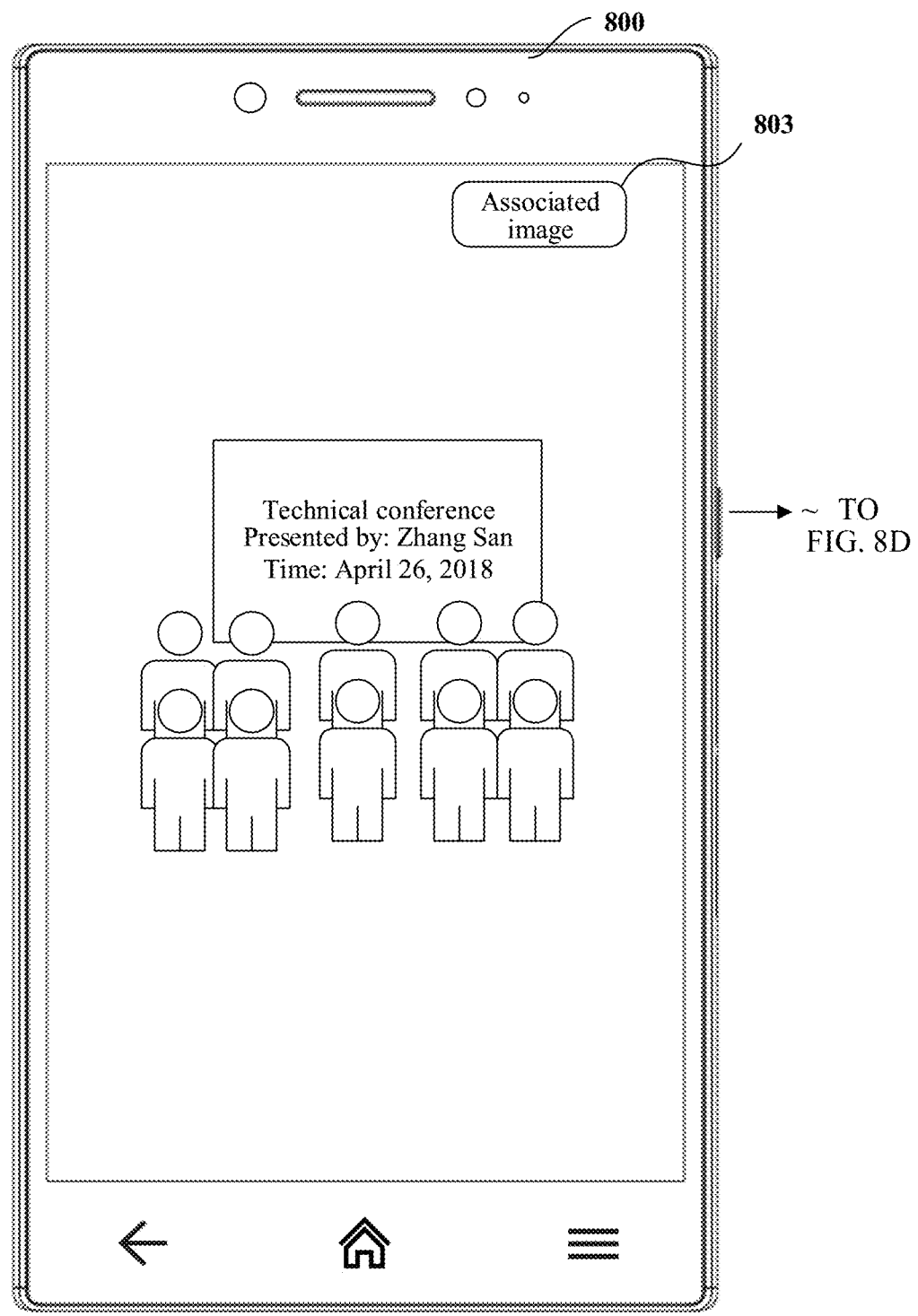
Figure 8D:
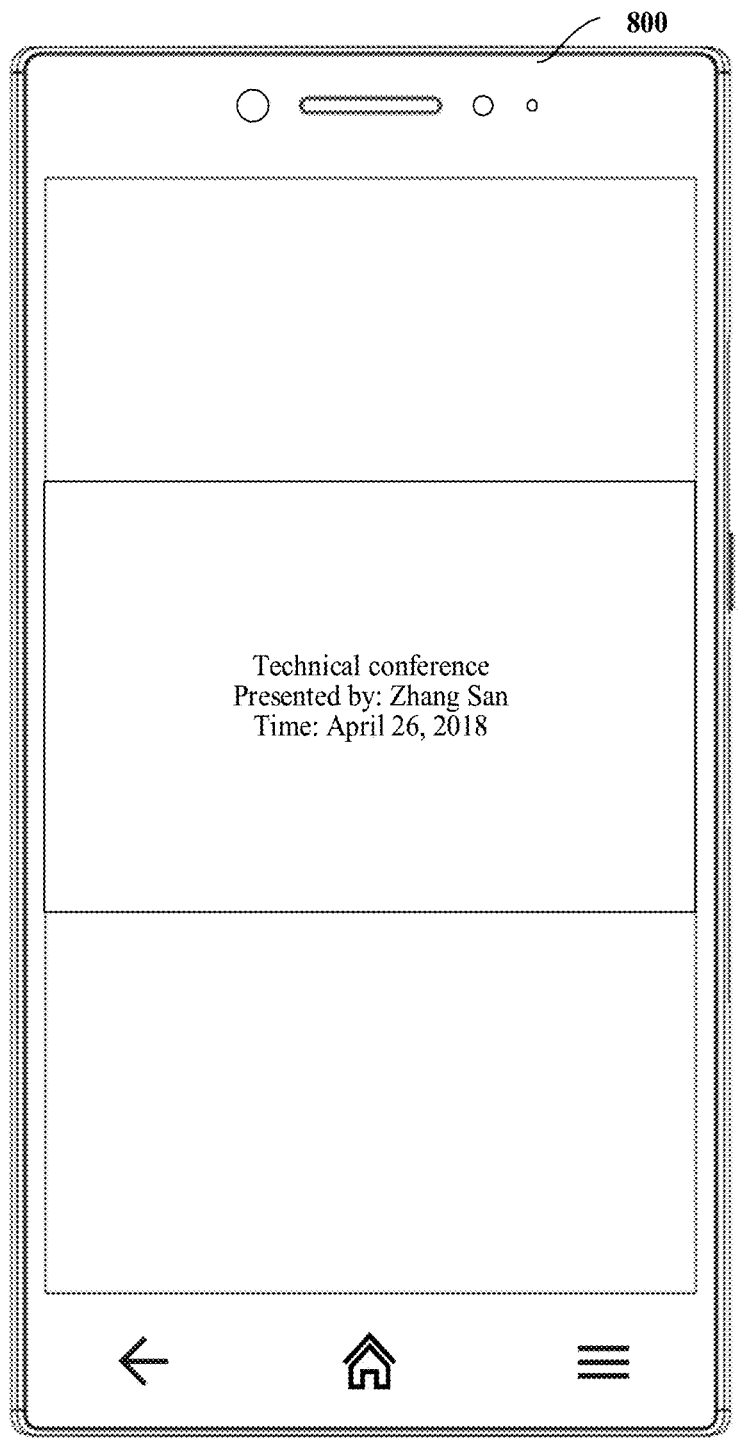

In FIG. 8(a), if the user triggers a photographing control 801, a mobile phone 800 obtains images through photographing (an image collected by a camera and a received image). In FIG. 8(b), the user triggers an album icon 802, and the mobile phone 800 displays the image collected by the camera, and displays prompt information on the display. As shown in FIG. 8(c), an "Associated image" button 803 is used as an example of the prompt information (certainly, the prompt information may alternatively be other information such as voice information). If the user triggers the "Associated image" button 803, the mobile phone 800 opens the received image, as shown in FIG. 8(d).

In this embodiment of this application, after receiving the first image information sent by the second terminal device, the first terminal device may further recognize the image information, and then display a recognition result on the preview screen. In an example, FIG. 4C is still used as an example. After detecting the user's operation of triggering "Screenshot and recognition", the first terminal device sends the second request information to the second terminal device. When receiving the first image information sent by the second terminal device, the first terminal device recognizes the first image information, and then displays a recognition result on the preview screen. For example, after detecting the user's operation of triggering "Screenshot and recognition", the first terminal device enables an image recognition module in the first terminal device. After receiving the first image information sent by the second terminal device, the first terminal device recognizes the first image information by using the image recognition module, to obtain the recognition result.

In this embodiment of this application, when recognizing the first image information, the first terminal device may recognize feature information in the first image information, determine a first application corresponding to the feature information in the first terminal device, and display, on the preview screen, a first shortcut used to open the first application.

Figure 9:
FIG. 9 is a schematic diagram of a display state of a display of a mobile phone according to an embodiment of the present invention.

As shown in FIG. 9, that the first terminal device is a mobile phone and the second terminal device is a television set is used as an example. After the mobile phone establishes a connection to the television set, when the mobile phone detects that the user performs the operation of triggering "Screenshot and recognition", the mobile phone sends, to the television set, second request information used to request to obtain current display content on a display. After receiving the second request information, the television set takes a screenshot of the current display content to obtain first image information, and sends the first image information to the mobile phone. The mobile phone may recognize the first image information. It is assumed that the television set currently plays an advertisement for a car. In this case, the first image information received by the mobile phone from the television set includes the advertisement for a car, for example, an image of a specific car. The mobile phone may recognize the car in the first image information, and the mobile phone determines an application corresponding to the car. For example, the mobile phone determines that the application corresponding to the car includes Autohome. The mobile phone displays a shortcut of an app of Autohome on the preview screen. When the user triggers the shortcut of Autohome, the app of Autohome on the mobile phone is opened, and information about the car, for example, a name, a model, a price, and a sales volume is displayed. If the user does not want to view a shortcut displayed by the first terminal device, the user may collapse the shortcut, or the user disables the "Screenshot and recognition" mode.

For another example, when the first image information received by the mobile phone includes information in English, the mobile phone may further translate the information in English in the first image information by using a translation application in the mobile phone, and display a translation result on the preview screen, to help the user understand display content to be photographed.

In the embodiment shown in FIG. 3 to FIG. 9, that one second terminal device is used as an example. In an actual application process, there may be more than one second terminal device. For example, the first terminal device establishes connections to a plurality of second terminal devices. When the first terminal device displays the preview screen in response to the operation of enabling the image shooting function, the preview screen includes image information sent by each of the plurality of second terminal devices. In this manner, the user can simultaneously view complete display content on a display of each of the plurality of second terminal devices by using the preview screen of the first terminal device, without considering a problem that display content on a second terminal device cannot be clearly viewed due to a shooting angle or a block to the display content on the second terminal device.

It can be learned from the foregoing descriptions that in the photographing method provided in this embodiment of this application, after the first terminal device enables the image shooting function, the displayed preview screen includes the first image information sent by the second terminal device, and the first image information includes the display content currently displayed on the display of the second terminal device, or the first image information includes the display content projected by the projector. When the user photographs display content on a screen by using the first terminal device, the user can clearly photograph the display content on the screen without considering a photographing angle, a photographing distance, or a block to the display content. Therefore, user experience is improved.

In the embodiment shown in FIG. 3 to FIG. 9, after the first terminal device connects to the second terminal device, if the user starts the camera of the first terminal device through triggering, the first terminal device displays, on the preview screen, the first image information sent by the second terminal device. To be specific, the first image information is displayed once the user starts the camera. In actual application, the user may not want to display the first image information once the camera is started. Therefore, in an example, after the first terminal device connects to the second terminal device, the user opens a camera application, and starts the camera to collect the preview image. When no image of a display appears in the preview image, the first terminal device displays only the image collected by the camera. When an image of a display appears in the preview image, the first terminal device recognizes the image of the display in the preview image. If the first terminal device recognizes that the display in the preview image is the display of the second terminal device (for example, after the first terminal device connects to the second terminal device, the first terminal device stores a device identifier and/or a device type of the second terminal device; and if a device identifier and/or a device type of the second terminal device are/is the same as the device identifier and/or the device type of the display in the preview image, the first terminal device determines that the display in the preview image is the display of the second terminal device), the first terminal device sends, to the second terminal device, the second request information used to request to obtain the first image information. Then, the first terminal device receives the first image information sent by the second terminal device, and displays the first image information on the preview screen. Alternatively, after receiving the first image information sent by the second terminal device, the first terminal device outputs the prompt information, to indicate, to the user, whether to display the first image information. If the user chooses to display the first image information, the first terminal device displays the first image information on the preview screen.

In this manner, after the first terminal device connects to the second terminal device, the first terminal device displays the first image information sent by the second terminal device, only after the image of the display of the second terminal device appears in the preview image in the first terminal device. If the image of the display of the second terminal device does not appear in the preview image in the first terminal device, the first terminal device does not display the first image information.

In the embodiment shown in FIG. 3 to FIG. 9, the user establishes, in the setting options, the connection between the first terminal device and the second terminal device. When the user enables the image shooting function of the first terminal device through triggering, the first image information sent by the second terminal device is displayed on the preview screen of the first terminal device. The following describes another embodiment. In this embodiment, after a user enables an image shooting function of a first terminal device through triggering, a preview screen is displayed, and the preview screen includes a preview image. When recognizing that the preview image includes a display, the first terminal device outputs prompt information to the user. The prompt information is used to indicate, to the user, that the first terminal device can connect to a second terminal device. The second terminal device is one or more devices determined by the first terminal device based on feature information of the display.

Figure 10:
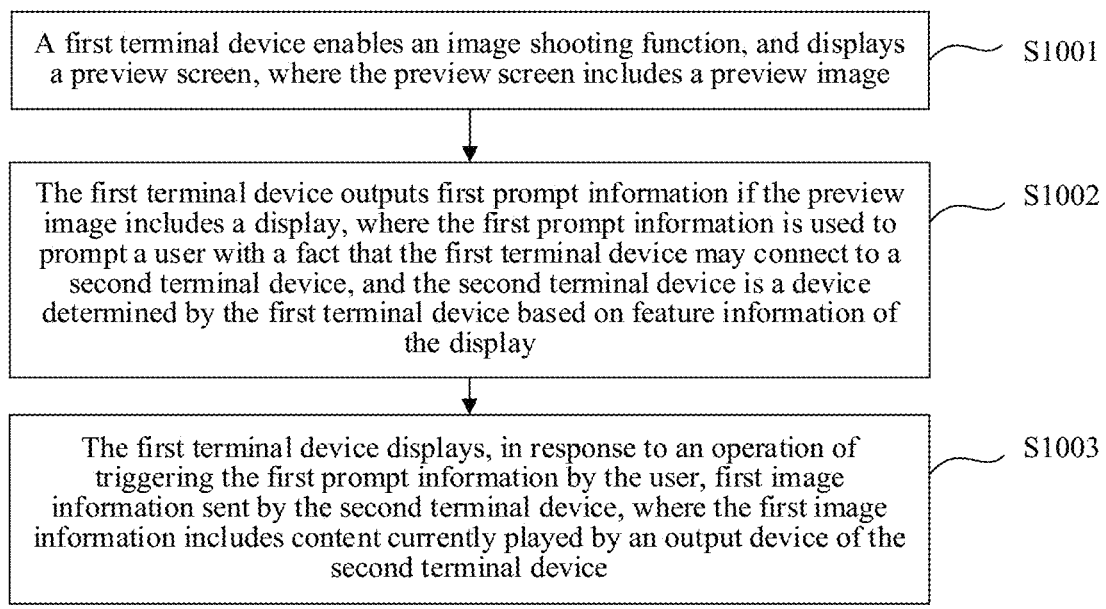
FIG. 10 is a schematic flowchart of a photographing method according to an embodiment of the present invention.

FIG. 10 is a flowchart of a photographing method according to an embodiment of this application. Two terminal devices in this embodiment of this application may be applied to the terminal device 100 shown in FIG. 1. As shown in FIG. 10, a procedure of the method includes the following steps.

S1001: A first terminal device enables an image shooting function, and displays a preview screen, where the preview screen includes a preview image.

S1002: The first terminal device outputs first prompt information if the preview image includes a display, where the first prompt information is used to indicate, to a user, that the first terminal device can connect to a second terminal device, and the second terminal device is a device determined by the first terminal device based on feature information of the display. Specifically, there may be one or more second terminal devices. If there is only one second terminal device, the first prompt information may be a device identifier of the second terminal device, or the first prompt information is text or voice information used to indicate, to the user, that the first terminal device can connect to the second terminal device. If there are a plurality of second terminal devices, the first prompt information may be a device list, and the device list includes a device identifier of each of the plurality of second terminal devices.

In this embodiment of this application, the first terminal device may recognize the preview image in real time. When it is recognized that the preview image includes a display (including a projection screen), the first terminal device triggers a short-range communications module such as Wi-Fi or Bluetooth to performing scanning for a nearby device. When a nearby device is obtained through scanning, the first terminal device may determine, based on the feature information of the display in the preview image, whether the display is a display of the device obtained through scanning. The feature information herein may be a device identifier, a device type, or the like of the display. For example, the feature information is a device identifier, and the device identifier is usually disposed on a bezel of the display. The first terminal device may recognize a bezel of the display in the preview image, and then determine whether a device identifier exists on the bezel. For example, the feature information is a device type, and the device type may be a projector, a notebook computer, a television set, or the like. The projector is used as an example. The projector usually projects display content onto a wall or a projection screen. The first terminal device may recognize, by using an image recognition technology, whether the display in the preview image is a wall or a projection screen. If the display in the preview image is a wall or a projection screen, the first terminal device determines that the device type is a projector.

When the first terminal device obtains a plurality of nearby devices through scanning, the first terminal device may determine, from the plurality of devices based on the feature information of the display in the preview image, a second terminal device that meets a condition, that is, determine, from the plurality of devices, a device to which the display in the preview image belongs.

For example, a manufacturer usually disposes a device identifier on a display. If the first terminal device obtains three nearby devices through scanning, and the first terminal device recognizes that there is a device identifier on the display in the preview image, the first terminal device may determine, from the three devices based on the device identifier, a device corresponding to the device identifier, namely, the second terminal device.

For another example, the first terminal device may recognize a device type of the display in the preview image, for example, a projector or a display of a notebook computer. If the first terminal device obtains three nearby devices through scanning, and the device type of the display in the preview image is a projector, the first terminal device may determine, from the three devices, a device that is a projector, namely, the second terminal device.

Certainly, when the first terminal device obtains only one nearby device through scanning, the first terminal device may alternatively determine, based on the feature information of the display in the preview image, whether the display in the preview image belongs to the device. If the display in the preview image belongs to the device, the device is the second terminal device.

In actual application, the first terminal device may obtain a plurality of nearby devices through scanning, and the first terminal device may determine, from the plurality of devices based on the feature information of the display, more than one second terminal device that meets the condition.

In an example, when the first terminal device determines that there is only one second terminal device that meets the condition, the first terminal device outputs prompt information, to prompt the user to connect the first terminal device to the second terminal device. For example, if there is only one second terminal device, the first terminal device may determine whether the first terminal device has established a connection to the second terminal device. If the first terminal device has established a connection to the second terminal device, the first terminal device displays prompt information on the preview screen, and the prompt information is used to prompt the user whether to capture a screen of the device. If the first terminal device does not connect to the second terminal device, the first terminal device may display prompt information on the preview screen, and the prompt information is used to prompt the user to connect the first terminal device and the second terminal device.

In another example, when the first terminal device determines that a plurality of second terminal devices meet the condition, the first terminal device may display a device list of the second terminal device on the preview screen. The device list includes a plurality of device identifiers, each device identifier corresponds to one second terminal device, and each second terminal device has a same device type and/or a same device identifier as the display in the preview image. The user may choose to trigger one device identifier (a device identifier of the device to which the display in the preview image belongs) in the plurality of device identifiers in the device list. The first terminal device determines, in response to a user's operation of triggering the device identifier, whether the first terminal device has established a connection to the device. If the first terminal device has established a connection to the device, the first terminal device sends, to the second terminal device, request information used to request to obtain first image information; or if the first terminal device does not establish a connection to the device, the first terminal device sends, to the device, request information used to request to establish a connection.

In this embodiment of this application, when recognizing that the preview image includes the display, the first terminal device may determine, based on the feature information of the display, several devices from a plurality of devices obtained through scanning. There is a relatively high probability that the determined devices include the device to which the display belongs. The first terminal device may display device identifiers of the several devices with the relatively high probability on the preview screen. The user may determine, from the device identifiers, the device to which the display belongs, and the first terminal device connects to the device determined by the user.

In still another example, when the first terminal device determines that no second terminal device meets the condition, in other words, a quantity of second terminal devices is 0, the first terminal device may also output prompt information, to indicate, to the user, that the user does not obtain the second terminal device through scanning, to prompt the user to check whether a short-range connection function is disabled in a peer device (the second terminal device to which the display in a preview image belongs), and the like. A user of the first terminal device may search for a reason based on the prompt information.

Figure 11A:
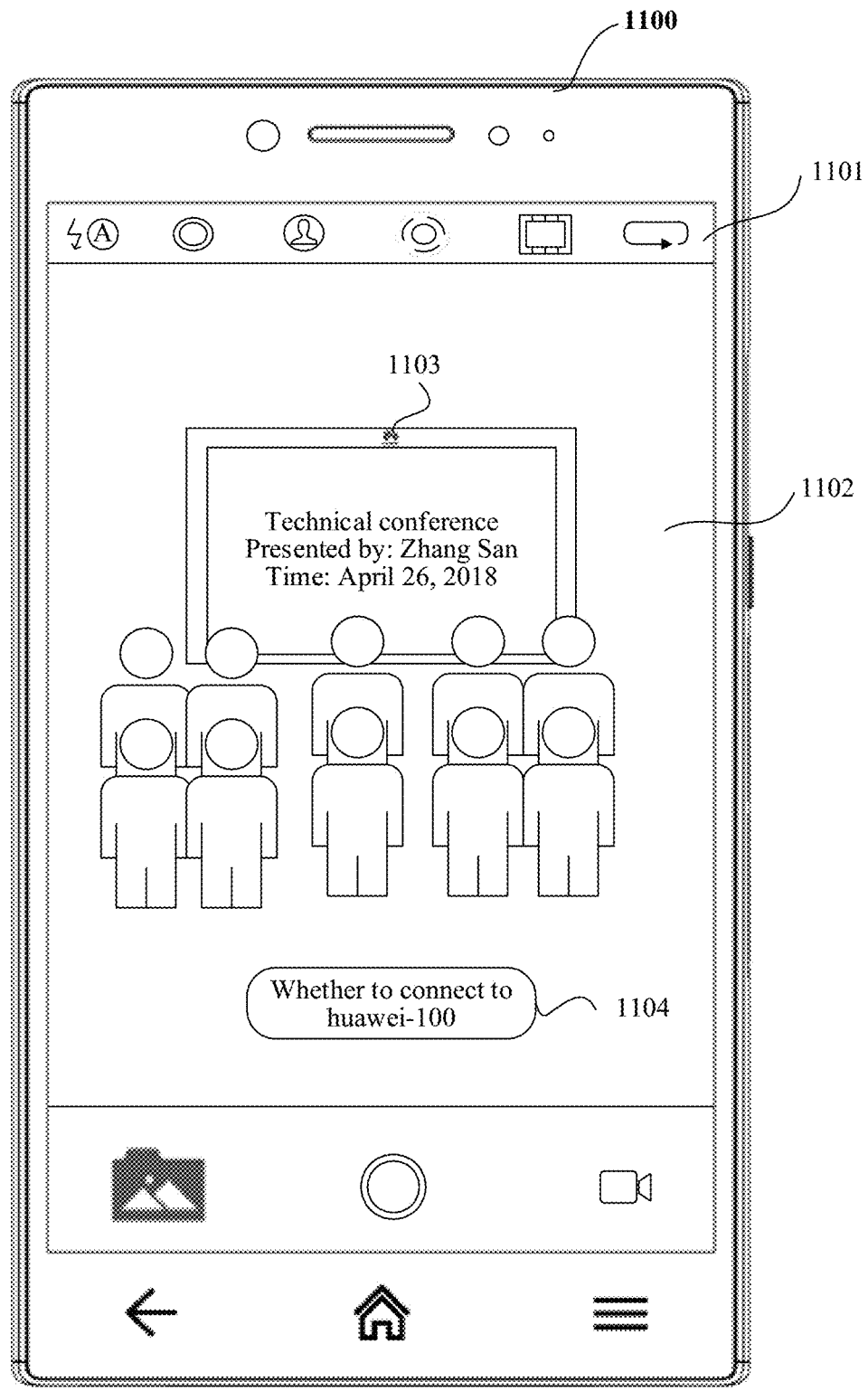
FIG. 11A is a schematic diagram of a display state of a display of a mobile phone according to an embodiment of the present invention.
Figure 11B:
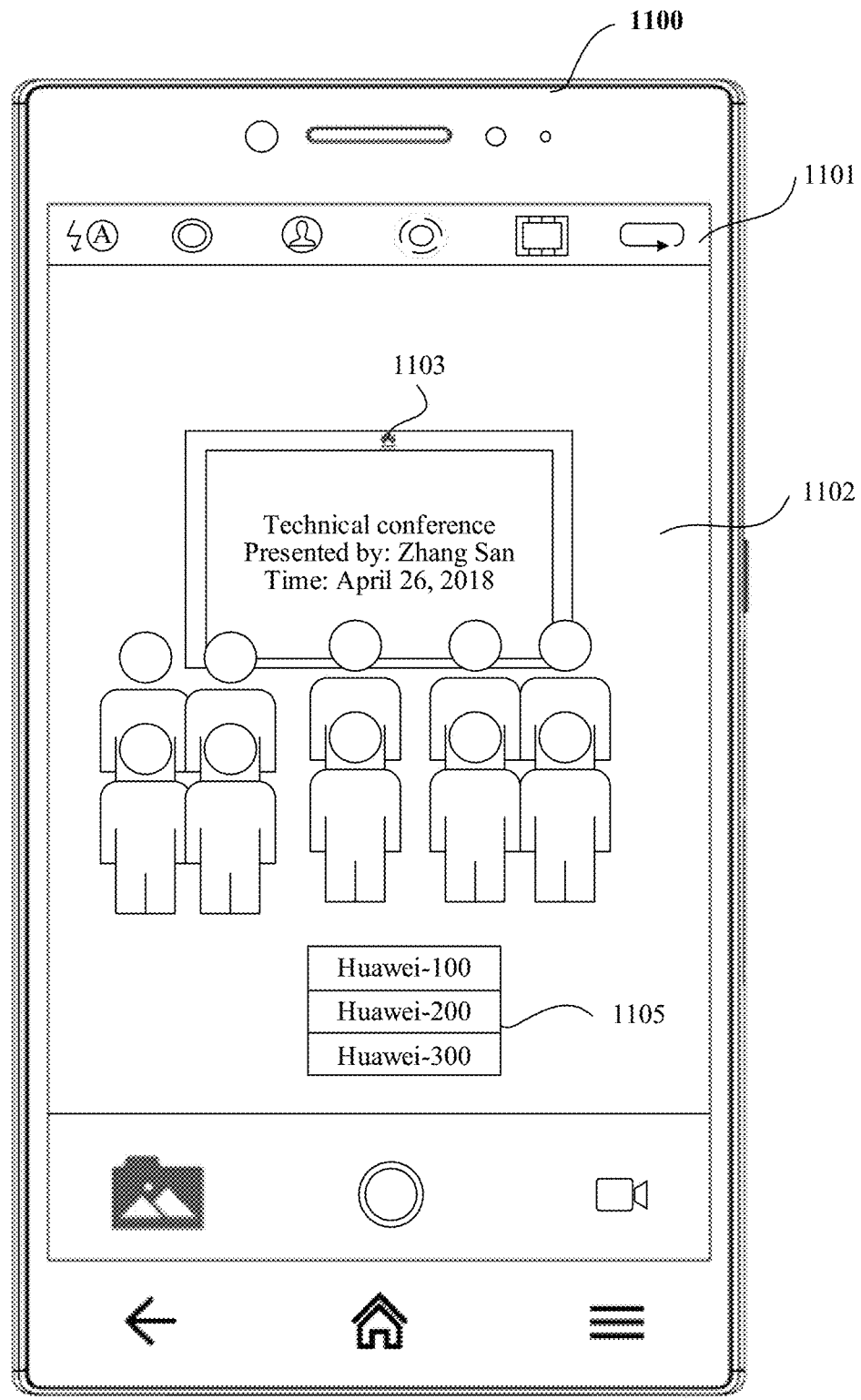
FIG. 11B is a schematic diagram of a display state of a display of a mobile phone according to an embodiment of the present invention.

For example, FIG. 11A and FIG. 11B are schematic diagrams of display states of a display of a mobile phone.

In FIG. 11A, a display of a mobile phone 1100 displays a preview screen 1101, and displays a preview image 1102 on the preview screen 1101. The preview image 1102 includes a display, and the mobile phone 1100 recognizes that a device identifier 1103 exists on the display. The mobile phone 1100 performs scanning for a nearby device. It is determined that a device identifier of only one device in nearby devices obtained through scanning includes "huawei", to be specific, huawei-100. The mobile phone 1100 displays prompt information 1104, and the prompt information 1104 is used to prompt the user to connect the mobile phone 1100 to the device.

In FIG. 11B, a display of a mobile phone 1100 displays a preview screen 1101, and displays a preview image 1102 on the preview screen 1101. The preview image 1102 includes a display, and the mobile phone 1100 recognizes that a device identifier 1103 exists on the display. The mobile phone 1100 performs scanning for a nearby device. It is determined that device identifiers of three devices in nearby devices obtained through scanning include "huawei", to be specific, huawei-100, huawei-200, and huawei-300. The mobile phone 1100 displays a device list 1105. The user may trigger a device in the device list 1105, to connect the mobile phone 1100 to the device.

Figure 11C:
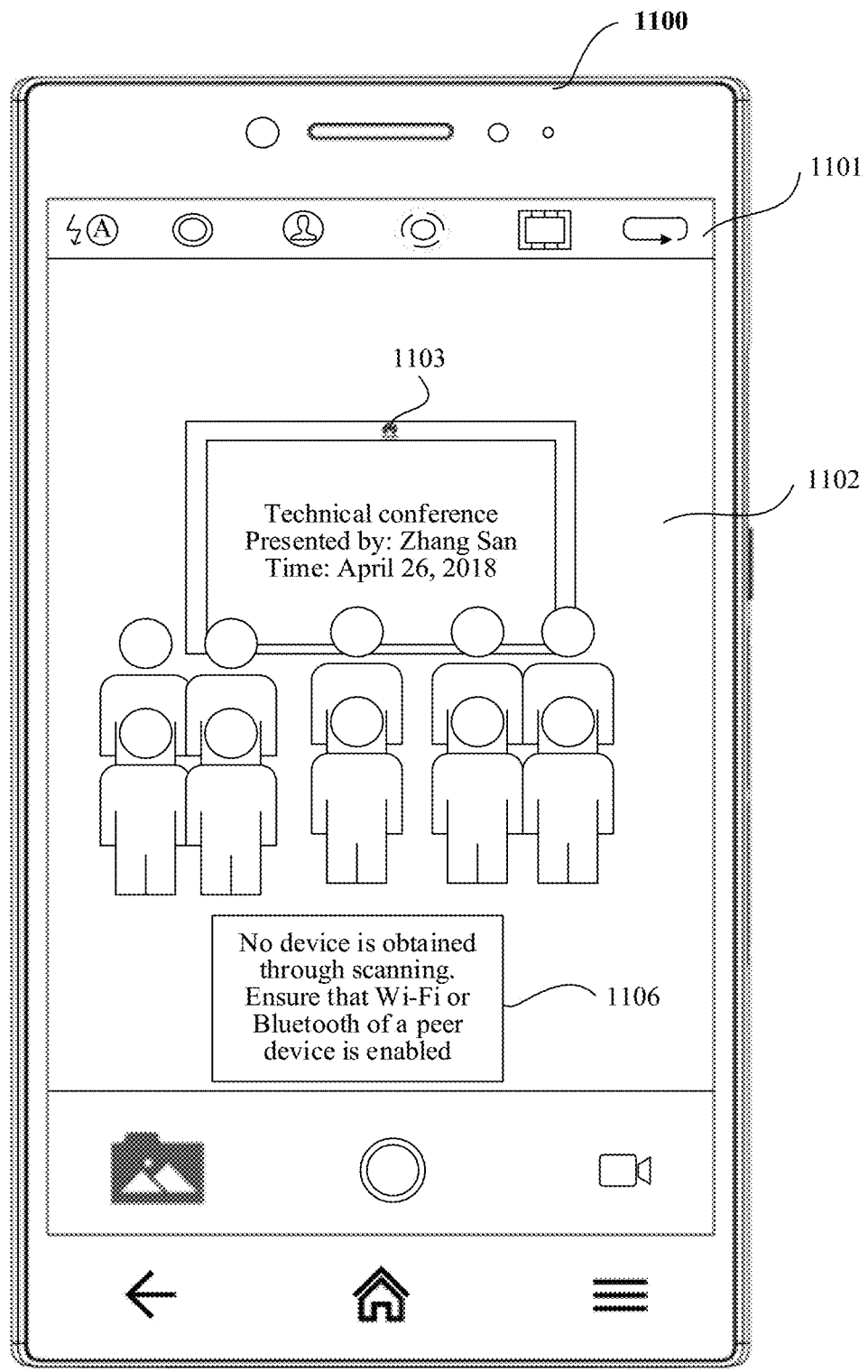
FIG. 11C is a schematic diagram of a display state of a display of a mobile phone according to an embodiment of the present invention.

In FIG. 11C, a display of a mobile phone 1100 displays a preview screen 1101, and displays a preview image 1102 on the preview screen 1101. The preview image 1102 includes a display, and the mobile phone 1100 recognizes that a device identifier 1103 exists on the display. The mobile phone 1100 performs scanning for a nearby device. It is determined that no device identifier of a device in a nearby device obtained through scanning includes "huawei". The mobile phone 1100 displays prompt information 1106, and the prompt information 1106 is used to indicate, to the user, that no related device is obtained through scanning, and to prompt the user to ensure that Wi-Fi/Bluetooth of a peer device is in an on state.

S1003: The first terminal device displays, in response to a user's operation of triggering the first prompt information, first image information sent by the second terminal device, where the first image information includes content currently played by an image output device of the second terminal device.

If there is only one second terminal device, the first terminal device sends, to the second terminal device in response to the user's operation of triggering the first prompt information, first request information used to request to establish a connection. After the first terminal device establishes a connection to the second terminal device, the first terminal device sends, to the second terminal device, second request information used to request to obtain the first image information, and the first image information includes the content currently played by the image output device of the second terminal device. The first terminal device receives the first image information sent by the second terminal device, and displays the first image information on the preview screen.

If there is a plurality of second terminal devices, in response to the user's operation of triggering a device identifier in the first prompt information, the first terminal device sends, to a second terminal device corresponding to the device identifier, first request information used to request to establish a connection. After the first terminal device establishes a connection to the second terminal device, the first terminal device sends, to the second terminal device, the second request information used to request to obtain the first image information, and the first image information includes the content currently played by the image output device of the second terminal device. The first terminal device receives the first image information sent by the second terminal device, and displays the first image information on the preview screen.

For a process in which the first terminal device sends the first request information/the second request information to the second terminal device, refer to the foregoing content. For brevity of the specification, details are not described herein again.

For a manner in which the first terminal device displays the first image information, refer to the foregoing content. For brevity of the specification, details are not described herein again.

In the embodiment shown in FIG. 10, after the user triggers enabling of the image shooting function of the first terminal device, the preview screen includes a preview image collected by a camera. In actual application, in a photographing process, the preview image collected by the camera of the first terminal device may change. For example, after the user starts a camera, the camera is aligned with the display of the second terminal device. In this case, the preview image includes the display of the second terminal device. After a period of time, if the user aligns the camera with a display of a third terminal device, the preview image includes the display of the third terminal device. In this process, the first terminal device receives both the image sent by the second terminal device and the image sent by the third terminal device. In this case, if the user triggers a photographing control, an image obtained by the first terminal device through photographing includes the display of the third terminal device. Therefore, the first terminal device may correspondingly store the image obtained through photographing and the image sent by the third terminal device. When displaying the image obtained through photographing, the first terminal device may display second prompt information, to prompt the user to view the image sent by the third terminal device. Because the first terminal device does not shoot an image including the display of the second terminal device, the first terminal device may store, at a specific location, the image sent by the second terminal device, or delete the image sent by the second terminal device to save space.

In another embodiment, the first terminal device starts the camera to display the preview image. If the preview image includes the image of the display, the first terminal device may recognize the feature information of the display included in the preview image, and determine the second terminal device based on the feature information. The first terminal device sends the first request information to the second terminal device in response to a user's operation of triggering the photographing control, to request to establish a connection to the second terminal device. After the first terminal device establishes the connection to the second terminal device, the first terminal device sends the second request information to the second terminal device, to request to obtain the first image information. After receiving the first image information, the first terminal device stores the first image information (for example, correspondingly stores, based on the foregoing descriptions, the first image information and an image collected by the camera).

In this embodiment, when the user photographs a screen by using the first terminal device, the first terminal device determines the second terminal device based on the feature information of the screen, and indicates, to the user, that the first terminal device may establish a connection to the second terminal device. The user may trigger transmission of the first image information by using the photographing control. In a conventional technical solution, after a first terminal device connects to a second terminal device, a user needs to perform a series of operations on a peer device, namely, the second terminal device, to send first image information to the first terminal device by using the second terminal device. However, in the solution in this embodiment of this application, the user of the first terminal device only needs to start the camera of the first terminal device to display the preview image including the display of the second terminal device, and then triggers the photographing control to receive the first image information sent by the second terminal device. The user does not need to perform an operation on the second terminal device, and a process is simple. In addition, a specific application used for image transmission does not need to be installed in the first terminal device, and image transmission can be implemented by using the camera built in the first terminal device, to facilitate an operation performed by the user, and improve user experience.

In another embodiment, the first terminal device has established a connection to the second terminal device. The first terminal device starts the camera to display the preview image. When detecting the user's operation of triggering the photographing control, the first terminal device sends the second request information to the second terminal device to request to obtain the first image information. After receiving the first image information, the first terminal device stores the first image information.

In this embodiment, after connecting the first terminal device to the second terminal device, the user can trigger transmission of the first image information by using the photographing control, provided that the camera in the first terminal device is started through triggering. In a conventional technical solution, after a first terminal device connects to a second terminal device, a user needs to perform a series of operations on a peer device, namely, the second terminal device, to send first image information to the first terminal device by using the second terminal device. However, in the solution in this embodiment of this application, the user of the first terminal device only needs to start the camera of the first terminal device to display the preview screen, and then triggers the photographing control on the preview screen to receive the first image information sent by the second terminal device. The user does not need to perform an operation on the second terminal device, and a process is simple. In addition, a specific application used for image transmission does not need to be installed in the first terminal device, and image transmission can be implemented by using the camera built in the first terminal device, to facilitate an operation performed by the user, and improve user experience.

Implementations of this application may be randomly combined to achieve different technical effects.

In the foregoing embodiments provided in this application, the methods provided in the embodiments of this application are described from a perspective in which a terminal device serves as an execution body. To implement functions in the methods provided in the embodiments of this application, the terminal device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solutions.

Figure 12:
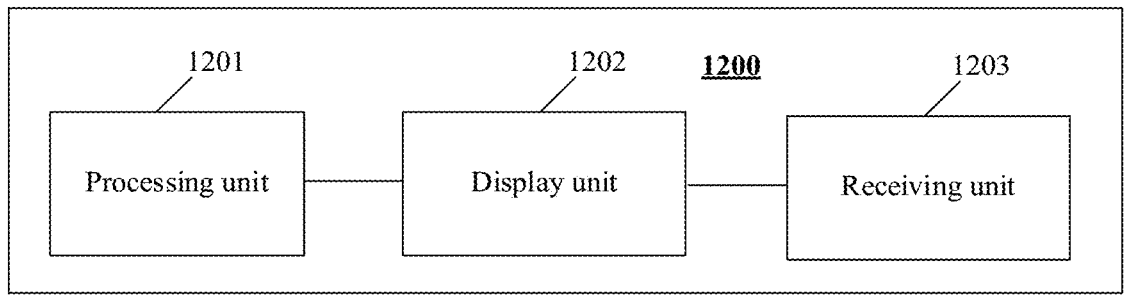
FIG. 12 is a schematic structural diagram of a terminal device according to an embodiment of the present invention.

Based on a same concept, FIG. 12 shows a first terminal device 1200 according to an embodiment of this application. The first terminal device 1200 may be a first terminal device having an image shooting capability, and the first terminal device may perform the methods in the embodiment shown in FIG. 10 and FIG. 11. As shown in FIG. 12, the first terminal device 1200 includes a processing unit 1201, a display unit 1202, and a receiving unit 1203.

The processing unit 1201 is configured to start a camera based on a first operation of a user, to obtain a preview image.

The display unit 1202 is configured to display the preview image.

The processing unit 1201 is further configured to output first prompt information based on the preview image when the preview image includes an image of an image output device. The first prompt information is used to indicate, to the user, that the first terminal device can connect to a second terminal device, and the second terminal device is a device determined by the first terminal device based on feature information of the display.

The first prompt information may be voice prompt information or text prompt information. For example, the processing unit 1201 may output the voice prompt information by using a speaker, or the processing unit 1201 may output the text prompt information by using the display unit 1202.

The processing unit 1201 is further configured to connect to the second terminal device in response to an operation of triggering the first prompt information.

The receiving unit 1203 is configured to receive first image information sent by the second terminal device. The first image information includes content currently played by an image output device of the second terminal device.

The display unit 1202 is further configured to display the first image.

Optionally, the processing unit 1201 is further configured to recognize the image that is of the image output device and that is included in the preview image, to obtain the feature information, where the feature information includes a device identifier and/or a device type.

Optionally, in a case in which the processing unit 1201 is configured to determine the second terminal device based on the feature information of the image output device, the following operations are performed: The processing unit 1201 obtains, through scanning, at least one additional terminal device by using a short-range communications module; and the processing unit 1201 determines the second terminal device from the at least one additional terminal device based on feature information of the image output device, where feature information of the second terminal device is the same as the feature information of the image output device.

Optionally, the first prompt information includes device identifiers of a plurality of second terminal devices, and in a case in which the processing unit 1201 is configured to connect to the second terminal device in response to the operation of triggering the first prompt information, the first terminal device 1200 specifically performs the following operations:

The receiving unit 1203 receives a user's selection operation of selecting one of the device identifiers of the plurality of second terminal devices, and the processing unit 1201 connects, in response to the selection operation, to a second terminal device corresponding to a device identifier selected in the selection operation.

In a case in which the receiving unit 1203 is configured to receive the first image information sent by the second terminal device, the receiving unit 1203 is specifically configured to perform the following operations:

The receiving unit 1203 receives first image information sent by the second terminal device corresponding to the selected device identifier, where the first image information includes content currently played by an image output device of the second terminal device corresponding to the selected device identifier.

Optionally, in a case in which the display unit 1202 displays the first image information, the following operations are performed: The processing unit 1201 scales down the preview image, and the display unit 1202 displays the scaled-down preview image in a first display area on the display; and the display unit 1202 displays the first image information in a second display area on the display.

Optionally, in a case in which the receiving unit 1203 is configured to receive the first image information sent by the second terminal device, the first terminal device 1200 specifically performs the following operations: In response to an operation of triggering a photographing control, the processing unit 1201 sends, to the second terminal device by using a sending unit (not shown in the figure), request information used to request to obtain the first image information; and the receiving unit 1203 receives the first image information sent by the second terminal device based on the request information.

Optionally, the processing unit 1201 is further configured to obtain a second image through photographing in response to the operation of triggering the photographing control, where the second image includes the image output device of the second terminal device; and the processing unit 1201 correspondingly stores the second image and a third image, where the third image is an image that is sent by the second terminal device and that is received by the first terminal device in a time period from a time at which a camera is started to a time at which the first terminal device obtains the second image through photographing, or the third image is the first image; and the third image includes content played by the image output device of the second terminal device.

Optionally, the processing unit 1201 is further configured to display, by using the display unit 1202, the second image and second prompt information in response to a second operation triggered by the user, where the second prompt information is used to prompt the user to open the third image; and the processing unit 1201 displays, by using the display unit 1202, the third image in response to an operation of triggering the second prompt information.

Figure 13:
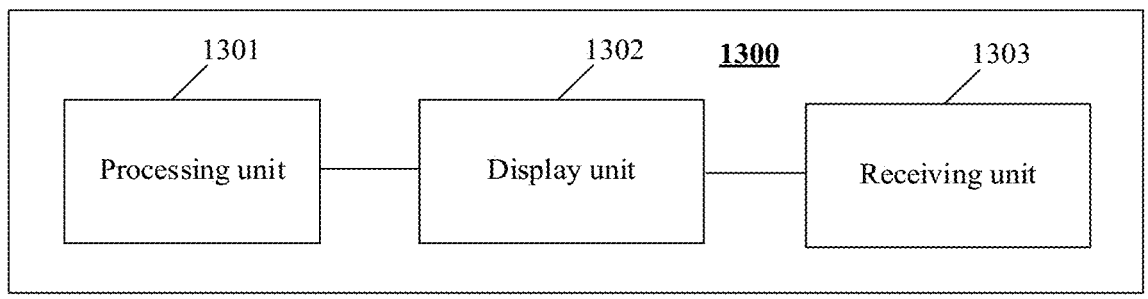
FIG. 13 is a schematic structural diagram of a terminal device according to an embodiment of the present invention.

Based on a same concept, FIG. 13 shows a first terminal device 1300 according to an embodiment of this application. The first terminal device 1300 may be a terminal device having an image shooting capability, and the terminal device may perform the method in the embodiment shown in FIG. 10 and FIG. 11. The first terminal device 1300 establishes a connection to a second terminal device, and the second terminal device includes an image output device. As shown in FIG. 13, the first terminal device 1300 includes a processing unit 1301, a display unit 1302, and a receiving unit 1303.

The processing unit 1301 is configured to: enable an image shooting function based on a first operation performed by a user, and obtain and display a preview image.

The display unit 1302 is configured to display the preview image.

The receiving unit 1303 is configured to receive, when the preview image includes an image of the image output device of the second terminal device, first image information sent by the second terminal device. The first image information includes content currently played by the image output device of the second terminal device.

The display unit 1302 is further configured to display the first image.

Optionally, when the preview image includes the image of the image output device of the second terminal device, in a case in which the receiving unit 1303 is configured to receive the first image information sent by the second terminal device, the first terminal device 1300 specifically performs the following operations:

The processing unit 1301 identifies the preview image, determines that the preview image includes the image output device, and determines whether feature information of the image output device matches feature information of the second terminal device, where the feature information includes a device identifier and/or a device type; and when the feature information of the image output device matches the feature information of the second terminal device, the processing unit 1301 sends, to the second terminal by using a sending unit (not shown in the figure), request information used to request to obtain the first image information; and the receiving unit 1303 receives the first image information sent by the second terminal device based on the request information.

Optionally, when the preview image includes the image of the image output device of the second terminal device, in a case in which the receiving unit 1303 is configured to receive the first image information sent by the second terminal device, the first terminal device 1300 specifically performs the following operations:

The processing unit 1301 identifies the preview image, determines that the preview image includes the image output device, and determines whether feature information of the image output device matches feature information of the second terminal device, where the feature information includes a device identifier and/or a device type; and when the feature information of the image output device matches the feature information of the second terminal device, and the receiving unit 1303 receives a user's operation of triggering a photographing control, the processing unit 1301 sends, to the second terminal by using a sending unit (not shown in the figure), request information used to request to obtain the first image information; and the receiving unit 1303 receives the first image information sent by the second terminal device based on the request information.

Optionally, when the display unit 1303 is configured to display the first image information, the first terminal device 1300 specifically performs the following operations: the processing unit 1301 scales down the preview image, and the display unit 1302 displays the scaled-down preview image in a first display area on the display; and the display unit 1302 displays the first image information in a second display area on the display.

Optionally, the processing unit 1301 is further configured to obtain a second image through photographing in response to the operation of triggering the photographing control; and the processing unit 1301 correspondingly stores the second image and a third image, where the third image is an image that is sent by the second terminal device and that is received by the first terminal device in a time period from a time at which a camera is started to a time at which the first terminal device obtains the second image through photographing, or the third image is the first image; and the third image includes content played by the image output device of the second terminal device.

Optionally, the processing unit 1301 is further configured to display, by using the display unit 1302, the second image and second prompt information in response to a second operation triggered by the user, where the second prompt information is used to prompt the user to open the third image; and the processing unit 1301 is further configured to display, by using the display unit 1302, the third image in response to an operation of triggering the second prompt information.

With descriptions of the foregoing embodiments, a person skilled in the art may clearly understand that the embodiments of this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (electrically erasable programmable read only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL, or wireless technologies such as infrared ray, radio and microwave are included in fixation of a medium to which they belong. A disk (disk) and disc (disc) used by the embodiments of this application includes a compact disc (compact disc, CD), a laser disc, an optical disc, a digital video disc (digital video disc, DVD), a floppy disk, and a Blu-ray disc, where the disk usually copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent replacement, or improvement made according to the disclosure of this application shall fall within the protection scope of this application.

What is claimed is:

1. A photographing method, implemented by a first terminal device, wherein the method comprises:
    enabling an image shooting function based on a first operation of a user;
    obtaining through the image shooting function a preview image;
    displaying the preview image;

outputting first prompt information based on the preview image when the preview image comprises an image of an image output device, wherein the first prompt information indicates that the first terminal device is capable of connecting to a second terminal device;

determining the second terminal device based on feature information of the image output device;

connecting to the second terminal device in response to an operation of triggering the first prompt information;

receiving a first image from the second terminal device, wherein the first image comprises content on the image output device; and displaying the first image.

2. The method of claim 1, further comprising recognizing the image of the image output device to obtain the feature information, wherein the feature information comprises a device identifier.

3. The method of claim 1, wherein determining the second terminal device comprises:

obtaining at least one additional terminal device using a short-range communications system through device scanning; and determining the second terminal device from the at least one additional terminal device based on the feature information, wherein second feature information of the second terminal device is the same as the feature information.

4. The method of claim 1, wherein the first prompt information comprises device identifiers of a plurality of terminal devices, wherein the method further comprises:

receiving a user's selection operation of one of the device identifiers of the terminal devices;

connecting to the second terminal device corresponding to the one of the device identifiers in the user's selection operation; and receiving the first image from the second terminal device corresponding to the device identifier, wherein the first image comprises the content on the image output device of the second terminal device corresponding to the one of the device identifiers.

5. The method of claim 1, further comprising:

scaling down the preview image;

displaying the preview image in a first display area on a display; and displaying the first image in a second display area on the display.

6. The method of claim 1, further comprising:

sending request information to obtain the first image from the second terminal device in response to an operation of triggering a photographing control; and receiving the first image from the second terminal device based on the request information.

7. The method of claim 1, further comprising:

obtaining a second image through photographing in response to an operation of triggering a photographing control, wherein the second image comprises the image output device of the second terminal device; and receiving a third image from the second terminal device during a time period from a first time when a camera starts to a second time when the second image is obtained, wherein the third image comprises the content; and storing the second image and the third image.

8. The method of claim 7, further comprising:

displaying the second image and second prompt information in response to a second operation of the user, wherein the second prompt information prompts the user to open the third image; and displaying the third image in response to an operation of triggering the second prompt information.

9. A photographing method, implemented by a first terminal device, wherein the method comprises:

establishing a connection to a second terminal device;

enabling an image shooting function based on a first operation of a user;

obtaining through the image shooting function a preview image;

displaying the preview image;

receiving a first image from the second terminal device when the preview image comprises an image of an image output device of the second terminal device, wherein the first image comprises content on the image output device; and displaying the first image.

10. The method of claim 9, further comprising:

recognizing the preview image;

determining that the preview image comprises the image output device;

determining whether feature information of the image output device matches feature information of the second terminal device, wherein the feature information comprises a device identifier or a device type;

sending request information used to obtain the first image from the second terminal device when the feature information of the image output device matches the feature information of the second terminal device; and receiving the first image from the second terminal device based on the request information; and displaying the first image.

11. The method of claim 9, further comprising:

recognizing the preview image;

determining that the preview image comprises the image output device;

determining whether feature information of the image output device matches feature information of the second terminal device, wherein the feature information comprises a device identifier or a device type;

in response to a user's operation of triggering a photographing control, sending, request information used to request to obtain the first image to the second terminal when the feature information of the image output device matches the feature information of the second terminal device;

receiving the first image from the second terminal device based on the request information; and displaying the first image.

12. The method of claim 9, further comprising:

scaling down the preview image;

displaying the preview image in a first display area on a display; and displaying the first image in a second display area on the display.

13. The method of claim 9, further comprising:

obtaining a second image through photographing in response to an operation of triggering a photographing control;

receiving a third image from the second terminal device during a time period from a first time when a camera starts to a second time when the second image is obtained, wherein the third image comprises the content; and storing the second image and the third image.

14. The method of claim 13, further comprising:
displaying the second image and second prompt information in response to a second operation triggered by the user, wherein the second prompt information prompts the user to open the third image; and
displaying the third image in response to an operation of triggering the second prompt information.

15. A first terminal device, comprising:
a camera configured to collect a preview image;
a display coupled to the camera and configured to display the preview image;
a processor; and
a memory coupled to the processor and configured to store instructions that, when executed by the processor, cause the first terminal device to be configured to:
enable an image shooting function based on a first operation of a user;
obtain through the image shooting function the preview image;
display the preview image;
output, to the user, first prompt information based on the preview image when the preview image comprises an image of an image output device, wherein the first prompt information indicates to the user that the first terminal device is capable of connecting to a second terminal device;
determine the second terminal device based on feature information of the image output device;
connect to the second terminal device in response to an operation of triggering the first prompt information;
receive a first image from the second terminal device, wherein the first image comprises content on the image output device of the second terminal device; and
display the first image.

16. A first terminal device, comprising:
a camera configured to collect a preview image;
a display coupled to the camera and configured to display the preview image;
a processor; and
a memory coupled to the processor and configured to store instructions that, when executed by the processor, cause the first terminal device to be configured to:
establish a connection to a second terminal device, wherein the first terminal device has an image shooting function;
enable the image shooting function based on a first operation of a user;
obtain through the image shooting function the preview image;
display the preview image;
receive a first image from the second terminal device when the preview image comprises an image of an image output device of the second terminal device, wherein the first image comprises content on the image output device of the second terminal device; and
display the first image.

17. A computer program product comprising computer-executable instructions for storage on a non-transitory computer-readable medium that, when executed by a processor, cause a first terminal device to:
enable an image shooting function based on a first operation of a user;
obtain through the image shooting function a preview image;
display the preview image;
output, to the user, first prompt information based on the preview image when the preview image comprises an image of an image output device, wherein the first prompt information indicates to the user that the first terminal device is capable of connecting to a second terminal device;
determine the second terminal device based on feature information of the image output device;
connect to the second terminal device in response to an operation of triggering the first prompt information;
receive a first image from the second terminal device, wherein the first image comprises content on the image output device of the second terminal device; and
display the first image.

18. The method of claim 1, further comprising recognizing the image of the image output device to obtain the feature information, wherein the feature information comprises a device type.

19. The method of claim 1, further comprising:
obtaining a second image through photographing in response to an operation of triggering a photographing control, wherein the second image comprises the image output device of the second terminal device;
receiving a third image, wherein the third image is the first image, and wherein the third image comprises the content; and
storing the second image and the third image.

20. The method of claim 9, further comprising:
obtaining a second image through photographing in response to the operation of triggering a photographing control;
receiving a third image from the second terminal device during a time period from a first time when a camera starts to a second time when the second image is obtained, wherein the third image comprises the content; and
storing the second image and the third image.

* * * * *

UNITED STATES PATENT AND TRADEMARK OFFICE
CERTIFICATE OF CORRECTION

PATENT NO. : 11,409,493 B2
APPLICATION NO. : 17/056912
DATED : August 9, 2022
INVENTOR(S) : Songchao Lu It is certified that error appears in the above-identified patent and that said Letters Patent is hereby corrected as shown below:

In the Claims

Claim 11, Column 32, Line 44: "control, sending, request" should read "control, sending request"

Signed and Sealed this
Fourth Day of October, 2022

Katherine Kelly Vidal
*Director of the United States Patent and Trademark Office*